United States Patent
Park et al.

(10) Patent No.: US 12,339,518 B2
(45) Date of Patent: Jun. 24, 2025

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventors: Tae Bong Park, Seoul (KR); Hyun Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 770 days.

(21) Appl. No.: 17/297,912

(22) PCT Filed: Mar. 20, 2020

(86) PCT No.: PCT/KR2020/003838
§ 371 (c)(1),
(2) Date: May 27, 2021

(87) PCT Pub. No.: WO2020/197178
PCT Pub. Date: Oct. 1, 2020

(65) Prior Publication Data
US 2022/0043235 A1 Feb. 10, 2022

(30) Foreign Application Priority Data

Mar. 26, 2019  (KR) .................. 10-2019-0034239
Mar. 26, 2019  (KR) .................. 10-2019-0034240

(51) Int. Cl.
*G02B 7/09* (2021.01)
*G02B 7/08* (2021.01)
(Continued)

(52) U.S. Cl.
CPC .............. *G02B 7/09* (2013.01); *G02B 7/08* (2013.01); *G02B 27/646* (2013.01); *G03B 13/36* (2013.01)

(58) Field of Classification Search
CPC ... G02B 7/09; G02B 7/08; G02B 7/28; G02B 7/05; G02B 7/005; G02B 27/646;
(Continued)

(56) References Cited

U.S. PATENT DOCUMENTS 11,561,363 B2 * 1/2023 Lee .................. G03B 5/00
2015/0365568 A1 12/2015 Topliss et al.
(Continued)

FOREIGN PATENT DOCUMENTS

CN 108351484 A 7/2018
CN 108781033 A 11/2018
(Continued)

*Primary Examiner* — Marin Pichler
(74) *Attorney, Agent, or Firm* — Birch, Stewart, Kolasch & Birch, LLP

(57) ABSTRACT

An embodiment comprises: a housing; a bobbin disposed in the housing; a coil coupled to the bobbin; a magnet disposed at the housing and facing the coil; a base spaced apart from the bobbin; a lower elastic member including a first elastic member and a second elastic member which are coupled to the bobbin and arranged on the base; a first sensing coil disposed at the housing to interact with the coil to generate a first inductive voltage; a second sensing coil disposed at the base to interact with the coil to generate a second inductive voltage; and a first terminal, a second terminal, a third terminal, and a fourth terminal which are coupled to the base and spaced apart from the first and the second elastic member, wherein one end of the coil is coupled to the first elastic member, the other end of the coil is coupled to the second elastic member, one end of the first sensing coil is coupled to the first terminal, the other end of the first sensing coil is coupled to the second terminal, one end of the second sensing coil is coupled to the third terminal, and the other end of the second sensing coil is coupled to the fourth terminal.

22 Claims, 23 Drawing Sheets

(51) Int. Cl.
*G02B 27/64* (2006.01)
*G03B 13/36* (2021.01)

(58) Field of Classification Search
CPC  G03B 13/36; G03B 13/34; G03B 2205/0069; G03B 30/00; G03B 3/10; G03B 2205/0015; G03B 2205/0007; G03B 2205/0046; G03B 19/22; G03B 17/02; H04N 23/00; H04N 23/60; H04N 5/2328; H04N 5/2253; H04N 5/2254; H05K 1/18; H02K 41/0354; H02K 41/0356
USPC ......... 359/822, 823, 824, 694, 813; 396/89; 348/208
See application file for complete search history.

(56) References Cited

U.S. PATENT DOCUMENTS

| | | | |
|---|---|---|---|
| 2018/0252893 A1* | 9/2018 | Park | H02K 41/035 |
| 2018/0356609 A1 | 12/2018 | Kim et al. | |
| 2019/0025540 A1 | 1/2019 | Shin et al. | |
| 2020/0033552 A1* | 1/2020 | Wu | G03B 3/10 |
| 2020/0033626 A1* | 1/2020 | Wu | G02B 7/023 |
| 2021/0080685 A1* | 3/2021 | Hasebe | G02B 7/08 |

FOREIGN PATENT DOCUMENTS

| | | | | |
|---|---|---|---|---|
| CN | 109073957 A | 12/2018 | | |
| JP | 2012-177754 A | 9/2012 | | |
| JP | 2016-509684 A | 3/2016 | | |
| KR | 10-2016-0126587 A | 11/2016 | | |
| KR | 10-2017-0104772 A | 9/2017 | | |
| KR | 10-2018-0036316 A | 4/2018 | | |
| KR | 10-2018-0037690 A | 4/2018 | | |
| KR | 10-2018-0067123 A | 6/2018 | | |
| KR | 10-2018-0135299 A | 12/2018 | | |
| KR | 10-2019-0013301 A | 2/2019 | | |
| KR | 10-2019-0027453 A | 3/2019 | | |
| WO | WO 2017/010745 A1 | 1/2017 | | |
| WO | WO-2019027176 A1 * | 2/2019 | | G02B 27/646 |

* cited by examiner

FIG.17B

| DV1 | POSITION OF BOBBIN | PS |
|---|---|---|
| VH_N | | |
| ⋮ | UPWARD OR DOWNWARD | High level |
| VH_1 | | |
| V0 | INITIAL POSITION | X |
| VL1 | | |
| ⋮ | DOWNWARD OR REARWARD | Low level |
| VL_M | | |

LENS DRIVING DEVICE, AND CAMERA MODULE AND OPTICAL DEVICE INCLUDING SAME

CROSS REFERENCE TO RELATED APPLICATIONS

This application is the National Phase of PCT International Application No. PCT/KR2020/003838, filed on Mar. 20, 2020, which claims priority under 35 U.S.C. 119(a) to Patent Application Nos. 10-2019-0034239, filed in the Republic of Korea on Mar. 26, 2019 and 10-2019-0034240, filed in the Republic of Korea on Mar. 26, 2019, all of which are hereby expressly incorporated by reference into the present application.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device each including the same, which are capable of improving sensitivity and accuracy of sensing using an induction coil for detecting displacement of a bobbin.

Technical Solution

A lens moving apparatus according to an embodiment includes a housing, a bobbin disposed inside the housing, a coil coupled to the bobbin, a magnet, which is disposed at the housing so as to face the coil, a base disposed so as to be spaced apart from the bobbin, a lower elastic member, which is coupled to the bobbin and includes a first elastic member and a second elastic member, which are disposed at the base, a first sensing coil, which is disposed at the housing and generates a first induction voltage through interaction with the coil, a second sensing coil, which is disposed at the base and generates a second induction voltage through interaction with the coil, and first to fourth terminals, which are coupled to the base and are spaced apart from the first and second elastic members, wherein the coil is coupled at one end thereof to the first elastic member and at the other end thereof to the second elastic member, the first sensing coil is coupled at one end thereof to the first terminal and at the other end thereof to the second terminal, and the second sensing coil is coupled at one end thereof to the third terminal and at the other end thereof to the fourth terminal.

The first induction voltage of the first sensing coil may be output through the first and second terminals, and the second induction voltage of the second sensing coil may be output through the third and fourth terminals.

The coil may have a ring shape surrounding an outer surface of the bobbin, and the first sensing coil may have a ring shape surrounding an outer surface of the housing, wherein the base may have a bore, and the second sensing coil may have a ring shape surrounding the bore in the base.

Each of the first to fourth terminals may be disposed at a portion thereof on an outer surface of one side portion of the base.

The first terminal may include a first body, which is disposed at a first side portion of the base, and a first extension, which extends from the first body and is coupled to the one end of the first sensing coil, and the second terminal may include a second body, which is disposed at the first side portion of the base, and a second extension, which extends from the second body and is coupled to the other end of the first sensing coil.

The first and second terminals may be disposed at two sides of one side portion of the base.

An upper surface of the base may be provided with first and second projections, which project toward the housing, the first terminal may include a portion, which is exposed from an upper surface of the first projection and is coupled to the one end of the first sensing coil, and the second terminal may include a portion, which is exposed from an upper surface of the second and is coupled to the other end of the first sensing coil.

Each of the first and second bodies may include a first portion, which is exposed from an upper surface of the base, and a second portion, which is bent and extends toward an outer surface of the base.

The first extension may extend toward one corner of the base from one side of the first portion of the first body, and the second extension may extend toward another corner of the base from one side of the first portion of the second body.

The first elastic member may include a first connecting terminal, which is bent and extends toward an outer surface of the base, and the second elastic member may include a second connecting terminal, which is bent and extends toward the outer surface of the base.

Alternatively, the lens moving apparatus may include first and second connecting terminals disposed on the outer surface of the base, the first elastic member may be coupled to the first connecting terminal via a first conductive adhesive, and the second elastic member may be coupled to the second connecting terminal via a second conductive adhesive.

A portion of each of the first to fourth terminals may be disposed on the outer surface of the base, and a portion of each of the third and fourth terminals may be disposed between the portion of the first terminal and the portion of the second terminal.

Each of the first and second elastic members may include an inner portion coupled to a lower portion of the bobbin, an outer portion coupled to a lower portion of the housing, and a connector connecting the inner portion to the outer portion, the first connecting terminal may be bent at the outer portion of the first elastic member, and the second connecting terminal may be bent at the outer portion of the second elastic member.

The coil may be provided with a drive signal via the first connecting terminal of the first elastic member and the second connecting terminal of the second elastic member, and the drive signal may be an AC signal or may include both AC and DC components.

The drive signal may be a differential signal.

A lens moving apparatus according to another embodiment includes a housing, a bobbin disposed inside the housing, a coil coupled to the bobbin, a magnet, which is disposed at the housing so as to face the coil, a base disposed so as to be spaced apart from the bobbin, a first sensing coil, which is disposed at the housing and generates a first induction voltage through interaction with the coil, a second sensing coil, which is disposed at the base and generates a second induction voltage through interaction with the coil, and first to fourth terminals disposed at the base, wherein the first terminal is coupled to one end of the first sensing coil, and the second terminal is coupled to the other end of the first sensing coil, wherein the third terminal is coupled to one end of the second sensing coil, and the fourth terminal is coupled to the other end of the second sensing coil, and wherein a first coupling portion has a height higher than a second coupling portion with respect to the lower surface of the base, the first coupling portion being a coupling portion between one end of the first sensing coil and the first terminal and a coupling portion between the other end of the first sensing coil and the second terminal, and the second coupling portion being a coupling portion between one end of the second sensing coil and the third terminal and a coupling portion between the other end of the second sensing coil and the fourth terminal.

A lens moving apparatus according to a further embodiment includes a housing, a bobbin disposed inside the housing, a coil coupled to the bobbin, a magnet, which is disposed at the housing so as to face the coil, a base disposed so as to be spaced apart from the bobbin, a lower elastic member, which is coupled to the bobbin and includes a first elastic member and a second elastic member, which are disposed at the base, a first sensing coil, which is disposed at the housing and generates a first induction voltage through interaction with the coil, a second sensing coil, which is disposed at the base and generates a second induction voltage through interaction with the coil, and first to fourth terminals, which are coupled to the base and are spaced apart from the first and second elastic members, wherein the first elastic member includes a first connecting terminal, which is disposed on the outer surface of the base and is coupled to one end of the coil, and the second elastic member includes a second connecting terminal, which is disposed on the outer surface of the base and is coupled to the other end of the coil, wherein the first terminal is coupled to one end of the first sensing coil, and the second terminal is coupled to the other end of the sensing coil, wherein the third terminal is coupled to one end of the third sensing coil, and the fourth terminal is coupled to the other end of the sensing coil, and wherein each of the first to fourth terminals includes an extending portion disposed on the outer surface of the base, and the first and second connecting terminals and the extending portion of each of the first to fourth terminals are disposed inside a reference line, the reference line being a line connecting two corners of the lower surface of the base adjacent to the outer surface of the base, and the inside of the reference line being a side at which the center of the base is positioned with respect to the reference line.

Advantageous Effects

Embodiments are able to improve sensitivity and accuracy of sensing using an induction coil for detecting displacement of a bobbin.

DESCRIPTION OF DRAWINGS

FIG. 17B illustrates an embodiment of a lookup table for the position of the bobbin and the detection signal according to a voltage difference;

BEST MODE

Figure 1:
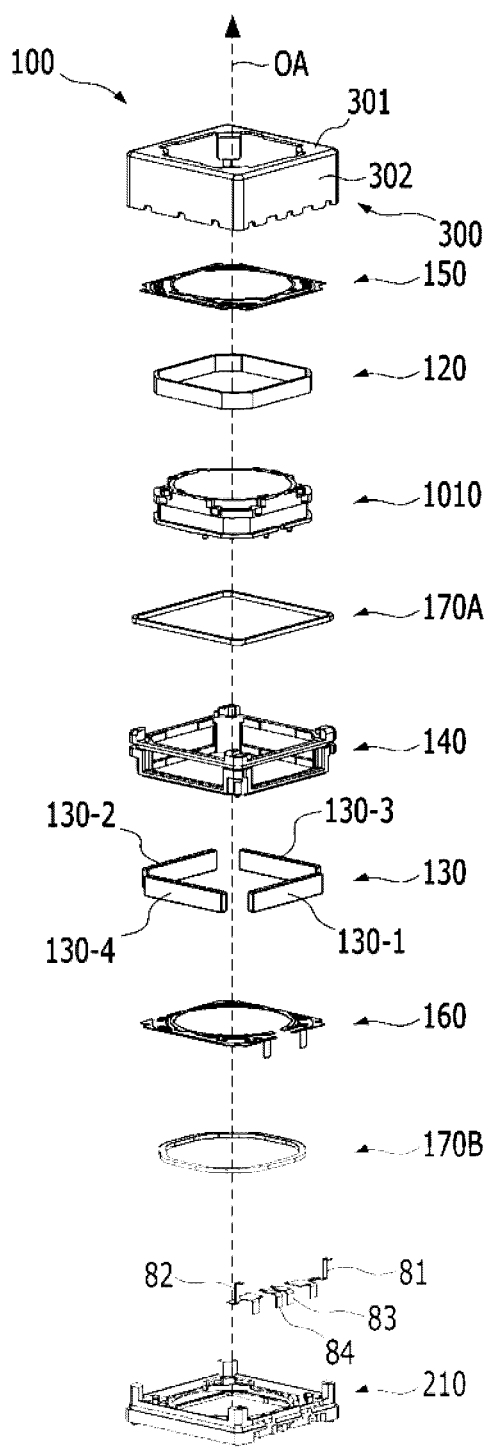
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

The "auto-focusing function" serves to automatically focus an image of a subject on the surface of an image sensor. The lens moving apparatus according to an embodiment may move an optical module, which is constituted of at least one lens, in the first direction, so as to perform auto-focusing.

Hereinafter, the lens moving apparatus may be alternatively referred to as a "lens moving unit", a "VCM (Voice Coil Motor)", an "actuator" or a "lens moving device". Hereinafter, the term "coil" may be interchangeably used with "coil unit", and the term "elastic member" may be interchangeably used with "elastic unit" or "spring".

In the follow description, the "terminal" may be alternatively referred to as a "pad", "electrode", "conductive layer" or "bonding portion".

For the convenience of description, although the lens moving apparatus according to an embodiment is described using a rectangular coordinate system (x, y, z), the lens moving apparatus may be described using some other coordinate systems, and the embodiments are not limited with regard thereto. In the respective drawings, the X-axis direction and the Y-axis direction mean directions perpendicular to an optical axis OA, i.e. the Z-axis. The Z-axis direction, which is the optical-axis direction, may be referred to as a "first direction", the X-axis direction may be referred to as a "second direction", and the Y-axis direction may be referred to as a "third direction".

Figure 2:
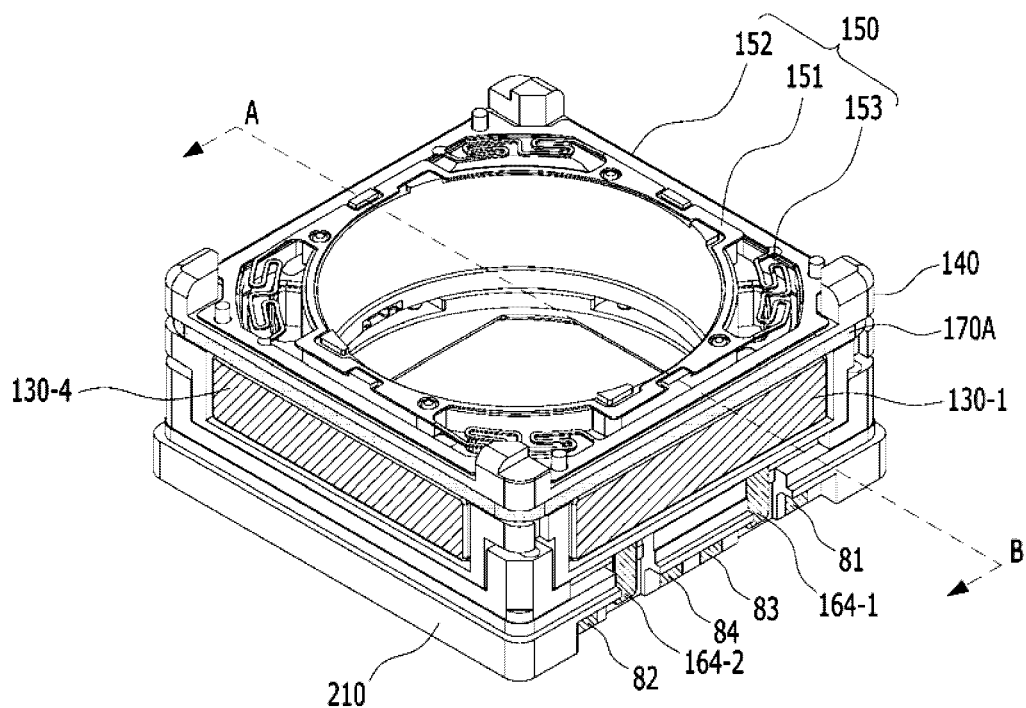
FIG. 2 is an assembled perspective view of the lens moving apparatus, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 is removed.

Referring to FIGS. 1 and 2, the lens moving apparatus 100 may include a bobbin 110, a coil 120, a magnet 130, a housing 140, a base 210, a first sensing coil 170A, a second sensing coil 170B, a first terminal 81, a second terminal 82, a third terminals 83 and a fourth terminal 84.

The lens moving apparatus 100 may further include at least one of an upper elastic member 150, a lower elastic member 160 and a cover member 300.

First, the cover member 300 will be described.

The cover member 300 may accommodate the bobbin 110, the coil 120, the magnet 130, the housing 140, the upper elastic member 150, the lower elastic member 160, the first and second sensing coils 17A and 17B and the first to fourth terminals 81 to 84 in the reception space defined between the cover member 300 and the base 210.

The cover member 300 may be configured to have the form of a box, which is open at the lower surface thereof and include an upper plate 301 and side plates 302, and the lower ends of the side plates 302 of the cover member 300 may be coupled to a step 211 of the base 210. When viewed from above, the upper plate 301 of the cover member 300 may have a polygonal shape, for example, a rectangular shape or an octagonal shape.

The upper plate 301 of the cover member 300 may have a bore (or a hollow) through which a lens (not shown) coupled to the bobbin 110 is exposed to external light.

Although the cover member 300 may be made of a nonmagnetic material such as stainless steel in order to prevent attraction to the magnet 130, the cover member 300 may be alternatively made of a magnetic material so as to serve as a yoke.

Next, the bobbin 110 will be described.

Figure 3A:
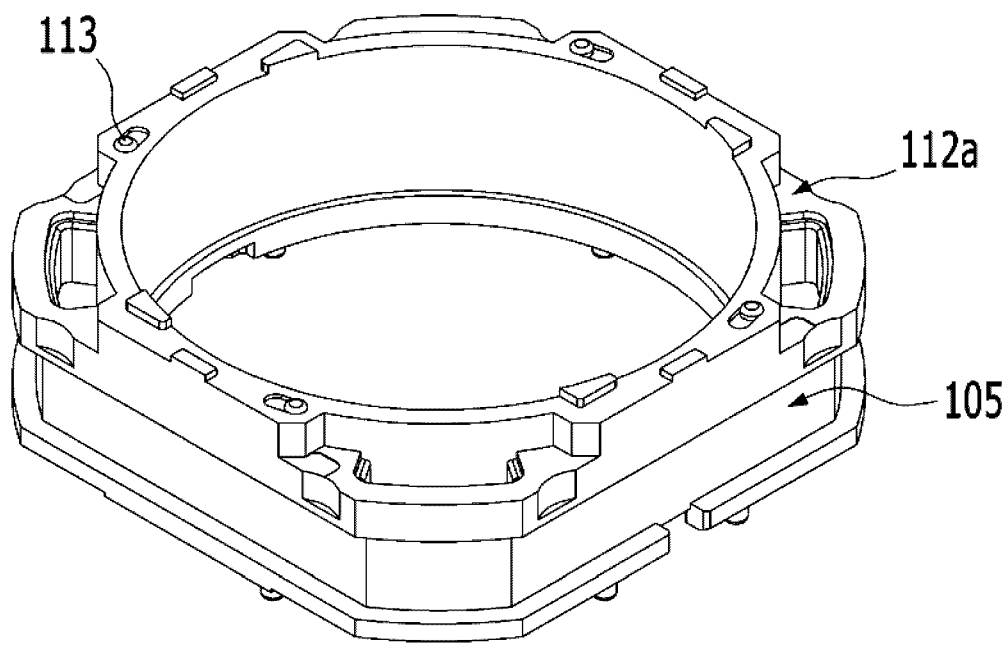
FIG. 3A is a perspective view of a bobbin.
Figure 3B:
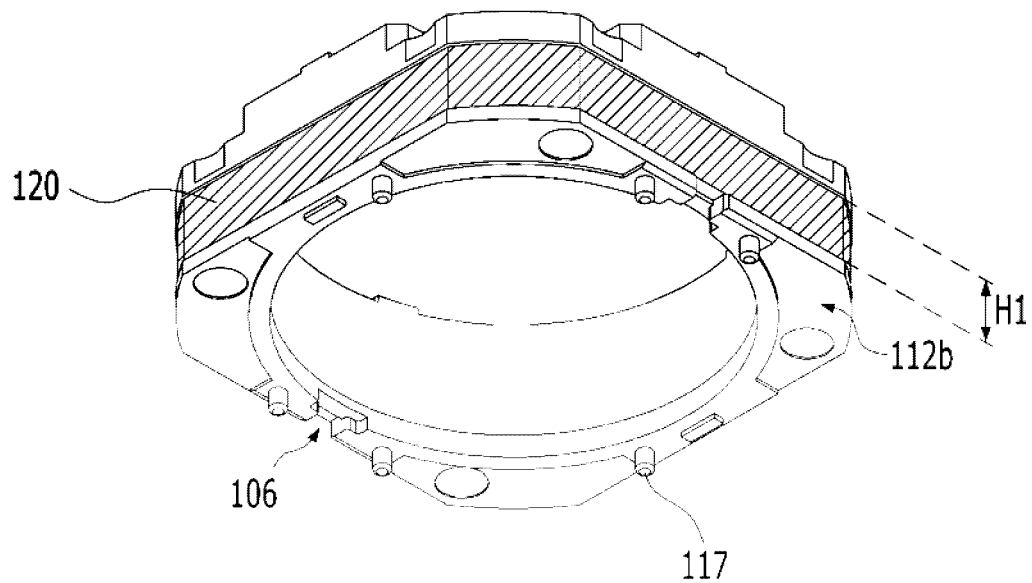
FIG. 3B is an assembled perspective view of the bobbin and a coil.

FIG. 3A is a perspective view of the bobbin 110 shown in FIG. 1. FIG. 3B is an assembled perspective view of the bobbin 110 and the coil 120.

Referring to FIGS. 3A and 3B, the bobbin 110 may be disposed in the housing 140, and may be moved in the direction of the optical axis OA or in a direction parallel to the optical axis by the electromagnetic interaction between the coil 120 and the magnet 130.

The bobbin 110 may have a bore or a hollow for mounting the lens or lens barrel therein. Although the bore (or the hollow) in the bobbin 110 may have a shape corresponding to the lens or lens barrel mounted therein, for example a circular shape or a polygonal shape, the disclosure is not limited thereto. For example, the bore in the bobbin 110 may have a hole shape, which is formed through the bobbin 110 in the optical-axis direction.

Although the lens or lens barrel may be directly coupled to the inner surface of the bobbin 110, the disclosure is not limited thereto. For example, the bobbin 110 may include the lens barrel (not shown) in which at least one lens is mounted, and the lens barrel may be coupled to the inner surface of the bobbin 110 in any of various ways. For example, the inner surface of the bobbin 110 may be provided with a thread for coupling to the lens or lens module.

The upper surface, the upper portion or the upper end of the bobbin 110 may be provided with at least one first coupler 113, which is to be coupled or fixed to the inner frame 151 of the upper elastic member 150.

The lower surface, the lower portion or the lower end of the bobbin 110 may be provided with at least one second coupler 117, which is to be coupled or fixed to the inner frame 161 of the lower elastic member 160.

For example, although each of the first coupler 113 and the second coupler 117 of the bobbin 110 may have the shape of a protrusion in FIGS. 3A and 3B, the disclosure is not limited thereto. In another embodiment, at least one of the first and second couplers of the bobbin 110 may have the shape of a coupling groove or flat surface.

A region of the upper surface of the bobbin 110 that corresponds to or is aligned with a first frame connector 153 of the upper elastic member 150 may be provided with a first escape groove 112a.

A region of the lower surface of the bobbin 110 that corresponds to or is aligned with a second frame connector 163 of the lower elastic member 160 may be provided with a second escape groove 112b.

When the bobbin 110 is moved in the first direction, spatial interference between the first and second frame connectors 153 and 163 and the bobbin 110 may be avoided by virtue of the first escape groove 112a and the second escaped groove 112b in the bobbin 110, and thus the first and second frame connectors 153 and 163 of the upper and lower elastic members 150 and 160 may be elastically deformed with ease.

In another embodiment, the first frame connector of the upper elastic member and the bobbin may be designed so as not to interfere with each other, and the bobbin may not have the first escape groove and/or the second escape groove.

The bobbin 110 may have at least one groove 105 formed in the outer surface thereof in which the coil 120 is disposed.

The coil 120 may be disposed or seated in the groove 105 in the bobbin 110.

For example, the coil 120 may be directly wound in the groove 105 in the bobbin 110 in a clockwise direction or in a counterclockwise direction about the optical axis OA.

The number and shape of grooves 105 in the bobbin 110 may correspond to the number and shape of coils disposed on the outer surface of the bobbin 110. In another embodiment, the bobbin 110 may not have the groove in which the coil is seated, and the coil 120 may be directly wound around the outer surface of the bobbin 110, and may be secured thereto.

The lower end of the outer surface of the bobbin 110 may have a groove 106 formed therein, through which the starting line (for example, one end) or the ending line (for example, the other end) of the coil 120 extends.

Next, the coil 120 will be described.

The coil 120 may be disposed at the bobbin 110, may be coupled or connected to the bobbin 110, or may be supported by the bobbin 110.

For example, the coil 120 may be disposed at the outer surface of the bobbin 110, and may electromagnetically interact with the magnet 130 disposed at the housing 140. In order to create electromagnetic force resulting from the interaction with the magnet 130, electric power is supplied to the coil 120 or a drive signal is applied to the coil 120.

In order to generate first induction voltage caused by mutual induction with the first sensing coil 170A and second induction voltage caused by mutual induction with the second sensing coil 170B, a drive signal supplied to the coil 120 may be an AC signal, or may include both AC and DC components.

For example, the AC signal supplied to the coil 120 may be a sinusoidal signal or a pulse signal (for example, a PWM signal). For example, the drive signal may be of a current type or a voltage type.

For example, in order to eliminate noise introduced into the first and second induction voltage, the drive signal supplied to the coil 120, for example, the pulse signal, may be a differential signal.

For example, although the DC component of the drive signal may move the AF operation unit in the optical-axis direction by virtue of the interaction with the magnet and the AC component of the drive signal may be supplied in order to generate the first and second induction voltages caused by the interaction with the first and second sensing coils 170A and 170B, the disclosure is not limited thereto.

By virtue of electromagnetic force resulting from the electromagnetic interaction between the coil 120 and the magnet 130, the bobbin 110, which is elastically supported by the upper and lower elastic members 150 and 160, may be moved in the optical-axis direction or in the first direction. The coil 120 and the magnet 130 may constitute a "lens moving unit" for moving the lens.

By controlling the drive signal supplied to the coil 120, it is possible to control movement of the bobbin 110 in the first direction, and it is thus possible to perform an autofocusing function.

The coil 120 may be disposed on the outer surface of at the bobbin 110 so as to surround the outer surface of the bobbin 110 about the optical axis in a clockwise or counterclockwise direction. For example, the coil 120 may be disposed in or wound in the groove 150 formed in the outer surface of the bobbin 110.

For example, the coil 120 may be configured to have a closed curve shape or a ring shape.

In another embodiment, the coil 120 may be embodied as a coil ring, which is wound in a clockwise or counterclockwise direction about an axis perpendicular to the optical axis. Although the number of coil rings may be the same as the number of magnets 130, the disclosure is not limited thereto.

The coil 120 may be conductively connected to at least one of the upper and lower elastic members 150 and 160. The drive signal may be applied to the coil 120 via at least one of the upper and lower elastic members 150 and 160. For example, the drive signal may be applied to the coil 120 via two elastic members 160-1 and 160-2.

Next, the housing 140 will be described.

Figure 4A:
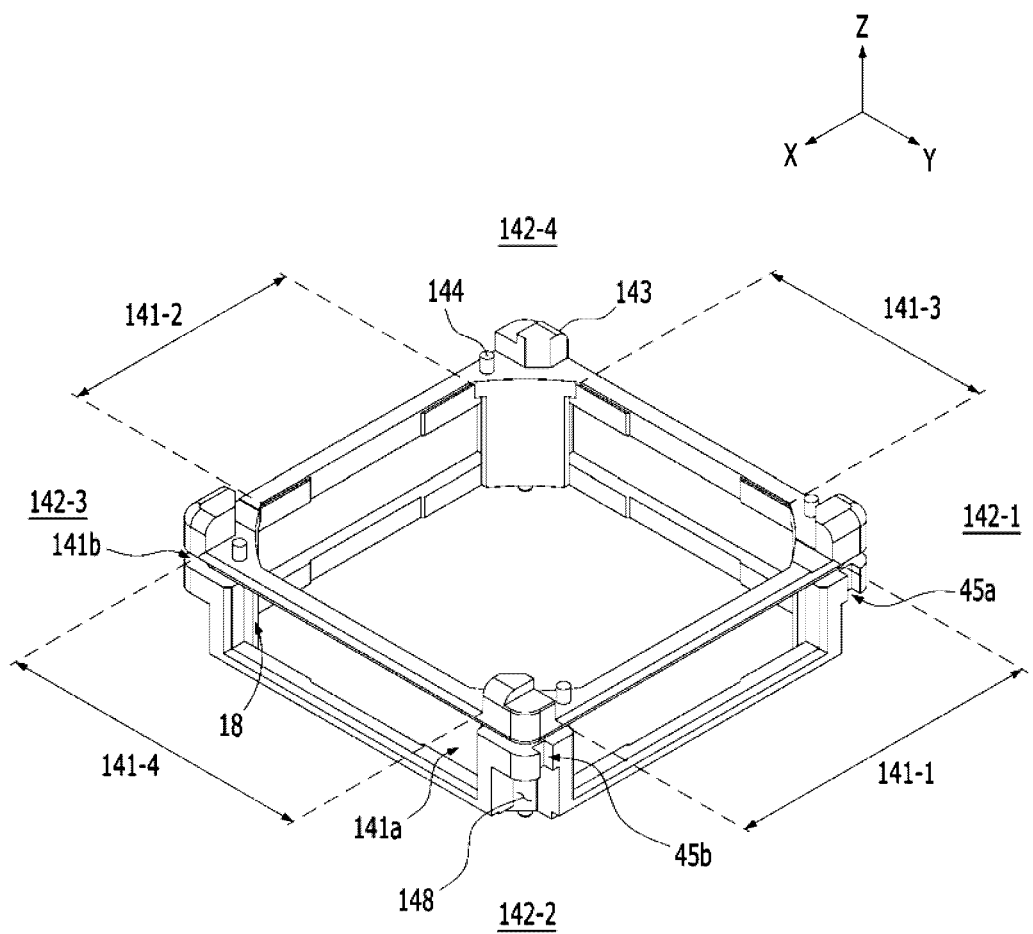
FIG. 4A is a perspective view of a housing.
Figure 4B:
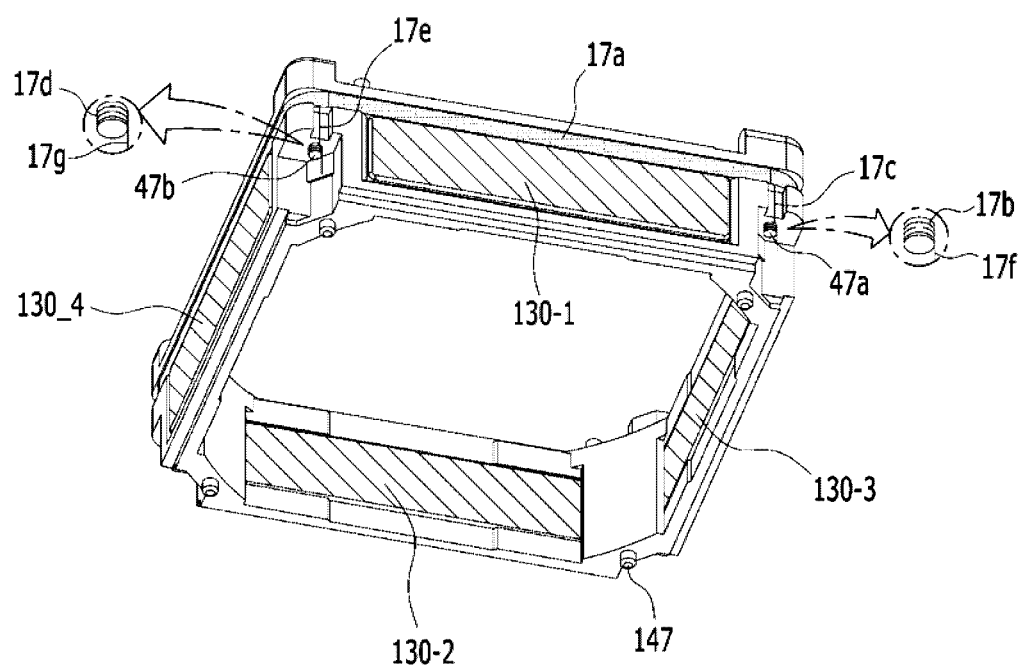
FIG. 4B is an assembled perspective view of the housing, a first sensing coil and a magnet.

FIG. 4A is a perspective view of the housing 140 shown in FIG. 1. FIG. 4B is an assembled perspective view of the housing 140, the first sensing coil 170A, and the magnet 130.

Referring to FIGS. 4A and 4B, the housing 140 may support the magnet 130, and may accommodate the bobbin 110 such that the bobbin 110 is movable in the first direction.

The housing 140 may have be formed to have the shape of a hollow column overall.

The housing 140 may have a bore (or a hollow) for accommodating the bobbin 110 therein, and the bore in the housing 140 may be a through hole, which is formed through the housing 140 in the optical-axis direction.

The housing 140 may include side portions (or "first side portions") 141-1 to 141-4 and corner portions (or "second side portions") 142-1 to 142-4.

For example, the housing 140 may include a plurality of side portions 141-1 to 141-4 and a plurality of corner portions 142-1 to 142-4, which define a polygonal (for example, a rectangular or octagonal) bore or a circular bore. Here, the corner portions of the housing 140 may be referred to as "columns".

For example, the side portions 141-1 to 141-4 of the housing 140 may be disposed at positions corresponding to the side plates 302 of the cover member 300, and a side portion of the housing 140 and a side plate of the cover member 300, which correspond to each other, may be parallel to each other.

For example, the side portions 141-1 to 141-4 of the housing 140 may be portions corresponding to the sides of the housing 140, and the corner portions 142-1 to 142-4 of the housing 140 may be portions corresponding to the corners of the housing 140.

The inner surface of each of the corner portions 142-1 to 142-4 of the housing 140 may be a flat surface, a chamfered surface or a curved surface.

The magnet 130 may be disposed or mounted on at least one of the side portions 141-1 to 141-4 of the housing 140. For example, the first to fourth side portions 141- to 141-4 of the housing 140 may have therein seating portions 141$a$ in which the magnets 130-1 to 130-4 are seated, disposed or fixed.

Although each of the seating portions 141$a$ may be an opening or a through hole, which is formed through a corresponding one of the side portions 141-1 to 141-4 of the housing 140 in FIG. 4A, the disclosure is not limited thereto. In another embodiment, the seating portion 141$a$ may be a groove or a recess.

The housing 140 may include a support 18 provided adjacent to the seating portion 141$a$ in order to support the periphery of the first surface of the magnet 130, which faces the coil 120.

The support 18 may be positioned adjacent to the inner surface of the housing 140, and may project in a horizontal direction from the side surface of the seating portion 141$a$. For example, the support 18 may include a tapered portion or a sloping surface. In another embodiment, the housing 140 may not include the support 18.

The housing 140 may have a seating groove 141$b$, in which the first sensing coil 170A of the second coil 120 is disposed, received or wound.

The seating groove 141$b$ may be formed in the upper end of the outer surface of at least one of the side portions 141-1 to 141-4 and the corner portions 142-1 to 142-4 of the housing 140.

For example, although the seating groove 141$b$ may be formed in the upper end of the outer surface of at least one of the side portions 141-1 to 141-4 and the corner portions 142-1 to 142-4 of the housing 140 so as to be spaced apart from the upper surface of the housing 140, the disclosure is not limited thereto.

The depth of the seating groove 141$b$ may be greater than or equal to the thickness of the first sensing coil 170A, which is wound around the seating groove 141$b$. For example, the first sensing coil 170A disposed in the seating groove 141$b$ may not project from the outer surfaces of the side portions 141-1 to 141-4 and the corner portions 142-1 to 142-4 of the housing 140. The reason for this is to prevent the first sensing coil 170A disposed in the seating groove 141$b$ from being separated outwards from the seating groove 141$b$.

The seating groove 141$b$ may be provided above the seating portion 141$a$, in which the magnet 130 is seated. For example, although the seating groove 141$b$ may not overlap the seating portion 141$a$ in a direction perpendicular to the optical axis OA, the disclosure is not limited thereto.

Each of the corner portions 142-1 to 142-4 of the housing 140 may be provided in the lower portion of the outer surface thereof with a guide groove 148, into which a corresponding one of projections 216$a$ to 216$d$ of the base 210 is fitted, fastened or coupled.

The housing 140 may have a first groove 45$a$, formed in the first corner portion 142-1, and a second groove 45$b$, formed in the second corner portion 142-2.

For example, the first groove 45$a$ may be formed in the outer surface of the first corner portion 142-1 of the housing 140, and the second groove 45$b$ may be formed in the outer surface of the second corner portion 142-2 of the housing 140.

For example, the first groove 45$a$ in the housing 140 may be positioned at one side of the seating portion 141$a$ formed in the first side portion 141-1 of the housing so as to allow disposition of the magnet 130-1, and the second groove 45$b$ may be positioned at the other side of the seating portion 141$a$ formed in the first side portion 141-1 of the housing 140.

In order to prevent a third portion 17$c$ and a fifth portion 17$e$ of the first sensing coil 170A from being separated from the outer surface of the side portion of the housing 140, the depth of each of the first groove 45$a$ and the second groove 45$b$ may be greater than the thickness of one strand of the first sensing coil 170A.

Each of the first groove 45$a$ and the second groove 45$b$ may communicate with the seating groove 141$b$ in the housing 140, and may extend from the seating groove 141$b$ to the guide groove 148 of a corresponding one of the first and second corner portions 142-1 and 142-2 of the housing 140.

Furthermore, the housing 140 may include a first protrusion 47$a$, formed on one surface of the guide groove 148 formed in the first corner portion 142-1, and a second protrusion 47$b$, formed in one surface of the guide groove 148 formed in the second corner portion 142-2. For example, the one surface of the guide groove 148 may be a surface positioned at the upper portion of the guide groove 148, among the surfaces defining the guide groove 148.

Each of the first and second protrusions 47$a$ and 47$b$ may project to the inside of the guide groove 148.

Specifically, each of the first and second protrusions 47$a$ and 47$b$ may project from one surface of the guide groove 148 toward the lower surface or the lower end of the housing 140, and may serve as a holder for holding a corresponding one of the two ends of the first sensing coil 170A.

In order to prevent the housing 140 from directly colliding with the inner surface of the upper plate of the cover member 300, the housing 140 may include stoppers 143 formed at the upper portion, the upper surface or the upper end of the housing 140. Here, the stoppers 143 may be alternatively referred to as "bosses" or "protrusions".

For example, although the stoppers 143 may be formed at the corner portions of the housing 140, the disclosure is not limited thereto. In another embodiment, the stoppers 143 may be formed at at least one of the side portions and the corner portions of the housing 140.

For example, although the upper surfaces of the stoppers 143 of the housing 140 may be in contact with the inner surface of the upper plate 301 of the cover member 300, the disclosure is not limited thereto. In another embodiment, the two surfaces may not be in contact with each other.

The upper surface, the upper end or the upper portion of the housing 140 may be provided with at least one first coupler 144, to which the outer frame 152 of the upper elastic member 150 is coupled. Furthermore, the lower surface, the lower portion or the lower end of the housing 140 may be provided with at least one second coupler 147, to which the outer frame 162 of the lower elastic member 160 is coupled.

Although each of the first and second couplers 144 and 147 of the housing 140 may have the shape of a protrusion in FIGS. 4A and 4B, the disclosure is not limited thereto. In another embodiment, at least one of the first and second couplers 144 and 147 may have a groove shape, or may be a flat surface.

For example, by means of an adhesive (not shown) such as silicone or epoxy, the guide groove 148 in the housing 140 may be coupled to the projections (for example, 216*a* to 216*d*) of the base 210, and the housing 140 may be coupled to the base 210.

Next, the magnet 130 will be described.

At the initial position of the AF operation unit (for example, the bobbin 110), the magnets 130 may be disposed at the side portions 141-1 to 141-4 of the housing 140 so as to correspond to or face the coil 120.

The initial position of the AF operation unit (for example, the bobbin 110) may be the original position of the AF operation unit in the state in which no electric power is applied to the coil 120 or the position at which the AF operation unit is located as the result of the upper and lower elastic members 150 and 160 being elastically deformed due only to the weight of the AF operation unit.

In addition, the initial position of the AF operation unit (for example, the bobbin 110) may be the position at which the AF operation unit is located when gravity acts in the direction from the bobbin 110 to the base 210 or when gravity acts in the direction from the base 210 to the bobbin 110.

For example, the AF operation unit may include the bobbin 110 and components which are mounted on the bobbin 110. For example, the AF operation unit may include the bobbin 110 and the coil 120, and may further include a lens or a lens barrel when the lens or the lens barrel is mounted on the AF operation unit.

An embodiment is able to perform bidirectional operation in which the AF operation unit is movable forwards (or upwards) and rearwards (or downwards) from the initial position of the AF operation unit by virtue of the interaction between the coil 120 and the magnet 130.

Another embodiment is able to perform unidirectional operation in which the AF operation unit is movable only forwards (or upwards) from the initial position of the AF operation unit by virtue of the interaction between the coil 120 and the magnet 130.

At the initial position of the AF operation unit, the magnets 130 may be respectively disposed in the seating portions 141*a* in the housing 140 so as to overlap the coil 120 in the second or third direction, perpendicular to the optical-axis direction.

In another embodiment, the seating portions 141*a* may not be formed in the side portions 141-1 to 141-4 of the housing 140, and the magnets 130 may be disposed on the outer surfaces or the inner surfaces of the side portions 141-1 to 141-4 of the housing 140.

Although the magnet 130 includes first to fourth magnets 130-1 to 130-4 respectively disposed in the first to fourth side portions 141-1 to 141-4 of the housing 140 in an embodiment, the disclosure is not limited thereto. The number of magnets 130 may be two or more. For example, another embodiment may include two magnets respectively disposed at two side portions of the housing 140, which face each other.

Although each of the magnets 130-1 to 130-4 may have a shape corresponding to the outer surfaces of the side portions 141-1 to 141-4 of the housing 140, for example, a polyhedral shape (for example, a rectangular parallelepiped shape), the disclosure is not limited thereto.

Each of the magnets 130-1 to 130-4 may be a monopolar magnetized magnet, which includes two different poles and an interface plane naturally formed between the two different poles.

For example, each of the magnets 130-1 to 130-4 may be a monopolar magnetized magnet in which a first surface thereof that faces the coil 120 is the N pole and a second surface thereof opposite the first surface is the S pole. However, the disclosure is not limited thereto, and the reverse disposition of the N pole and the S pole is also possible.

In another embodiment, in order to increase the electromagnetic force, each of the magnets 130-1 to 130-4 may be a bipolar magnetized magnet divided into two parts in a direction perpendicular to the optical axis. Here, although the magnets 130-1 to 130-4 may be embodied by a ferrite magnet, an alnico magnet, a rare-earth magnet or the like, the disclosure is not limited thereto.

When each of the magnets 130-1 to 130-4 is a bipolar magnetized magnet, each of the magnets 130-1 to 130-4 may include a first magnet part, a second magnet part, and a partition wall disposed between the first magnet part and the second magnet part.

The first magnet part may include an N pole, an S pole, and a first interface plane between the N pole and the S pole. Here, the first interface plane may be a portion that has substantially no magnetism and has a zone having almost no polarity, and may be a portion that is naturally formed in order to form a magnet composed of one N pole and one S pole.

The second magnet part may include an N pole, an S pole, and a second interface plane between the N pole and the S pole. Here, the second interface plane may be a portion that has substantially no magnetism and has a zone having almost no polarity, and may be a portion that is naturally formed in order to form a magnet composed of one N pole and one S pole.

The partition wall may separate or isolate the first magnet part and the second magnet part from each other, and may be a portion having substantially no magnetism or polarity. For example, the partition wall may be a nonmagnetic material, air or the like. That is, the partition wall may be considered a "neutral zone".

The partition wall may be a portion that is artificially formed when the first magnet part and the second magnet part are magnetized, and the width of the partition wall may be greater than the width of each of the first interface and the second interface. Here, the width of the partition wall may be the length of the partition wall in a direction toward the second magnet part from the first magnet part.

Although the first surface of each of the magnets 130-1 and 130-4 may be configured as a flat surface, the disclosure is not limited thereto. The first surface of each of the magnets 130-1 and 130-4 may be configured as a curved surface, a sloped surface or a tapered surface. For example, the first surface of each of the magnets 130-1 to 130-4 may be the surface that faces the outer surface of the bobbin 110 and/or the coil 120.

Next, the upper elastic member 150 and the lower elastic member 160 will be described.

Figure 5:
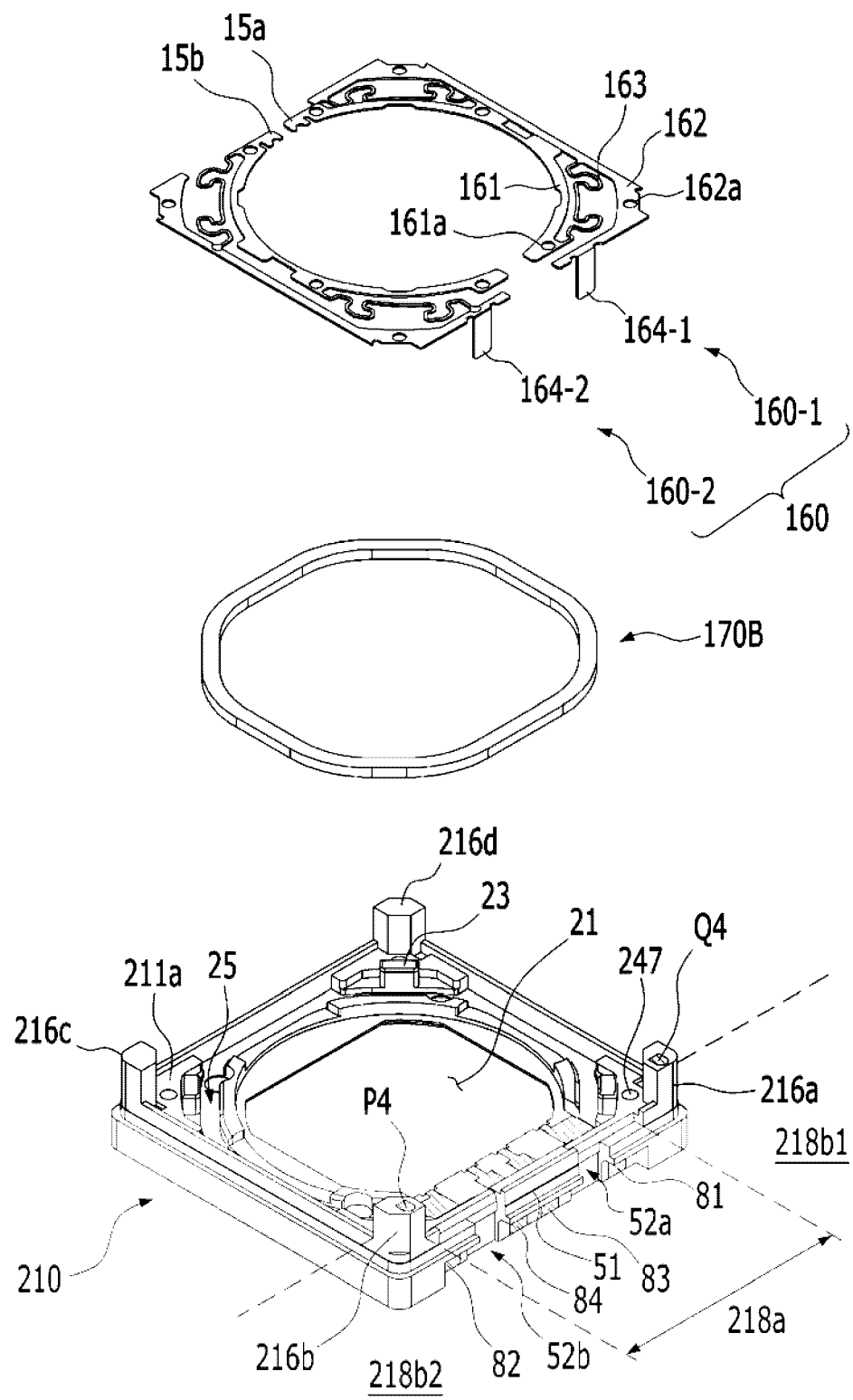
FIG. 5 is an exploded perspective view of a base, a second sensing coil and a lower elastic member, to which first to fourth terminals are coupled.
Figure 6:
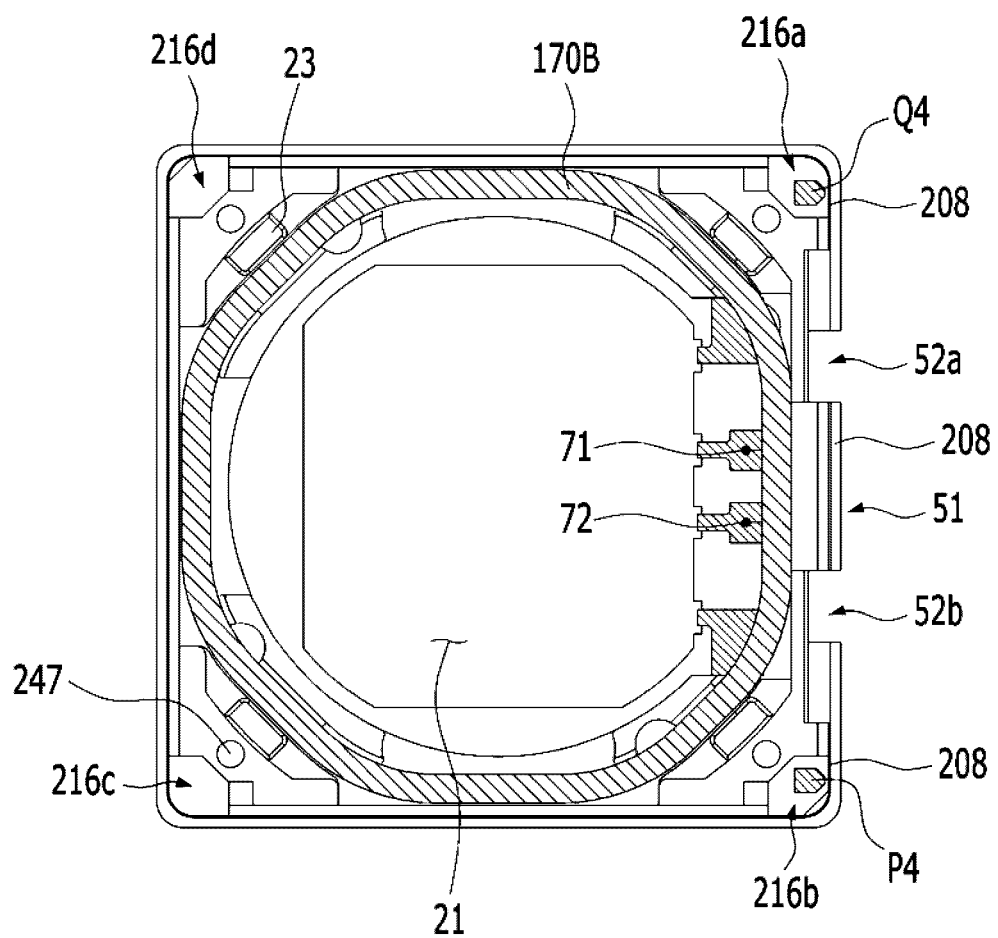
FIG. 6 is a plan view of the second sensing coil, the base and the first to fourth terminals.
Figure 7:
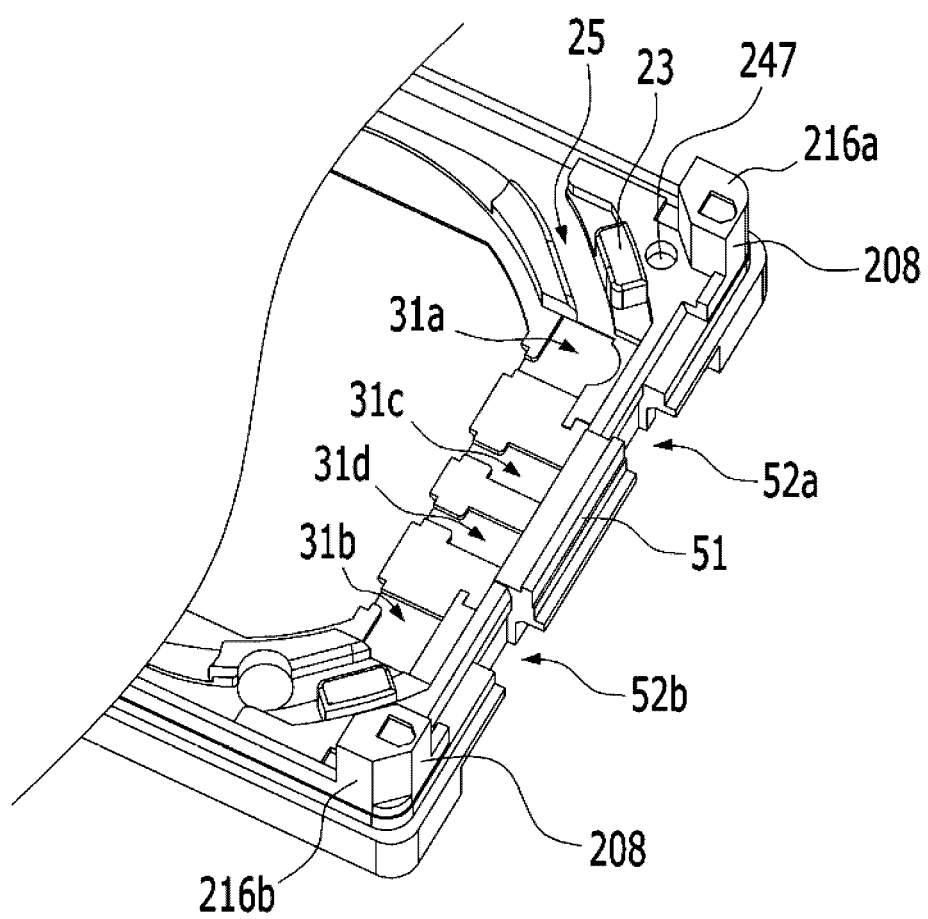
FIG. 7 is an enlarged partial view of the base shown in FIG. 6.
Figure 8:
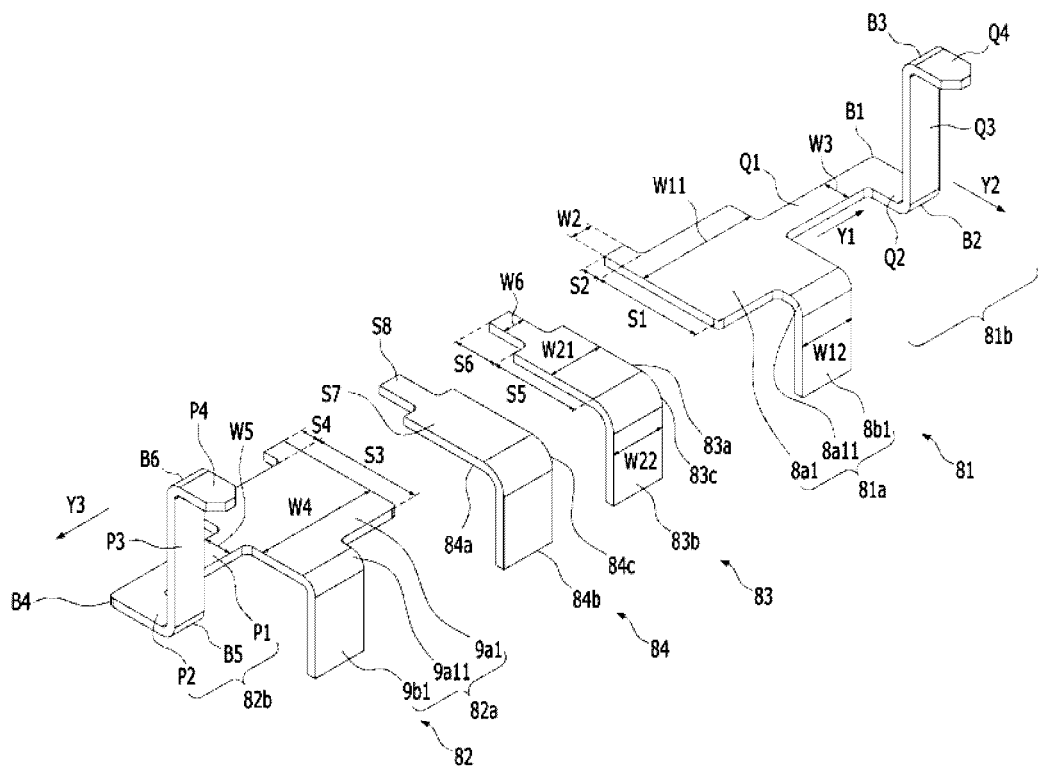
FIG. 8 is a perspective view of the first to fourth terminals.
Figure 9:
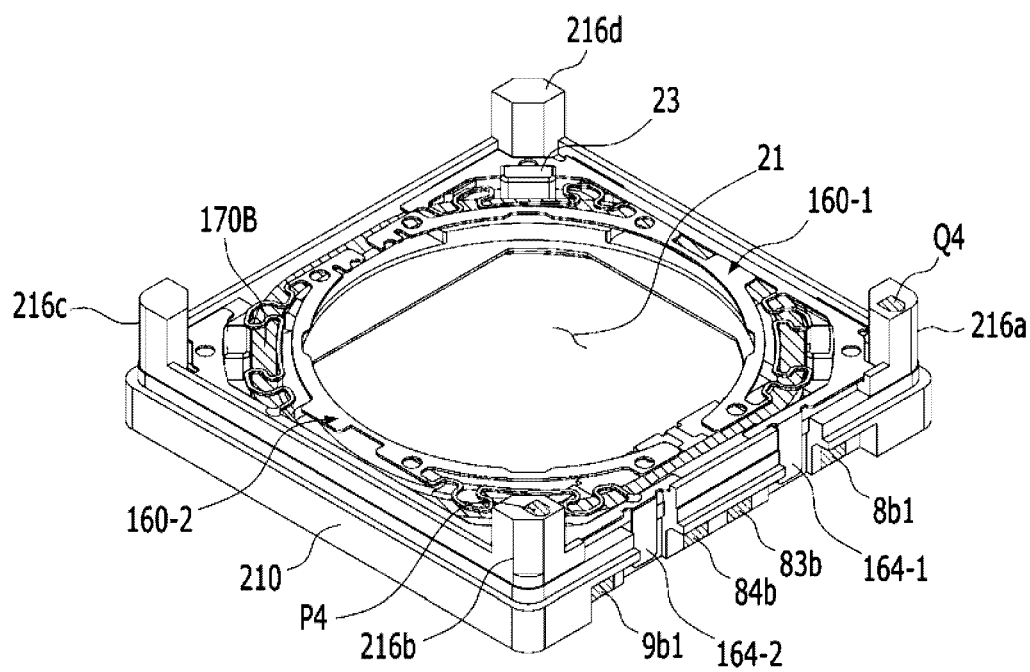
FIG. 9 is an assembled perspective view of the first to fourth terminals, the base, the second sensing coil and the lower elastic member.

FIG. 5 is an exploded perspective view of the base 210, the second sensing coil 170B and the lower elastic member 160, to which the first to fourth terminals 81 to 84 are coupled. FIG. 6 is a plan view of the second sensing coil 170B, the base 210 and the first to fourth terminals 81 to 84. FIG. 7 is an enlarged partial view of the base 210 shown in FIG. 6. FIG. 8 is a perspective view of the first to fourth terminals 81 to 84. FIG. 9 is an assembled perspective view of the first to fourth terminals 81 to 84, the base 210, the second sensing coil 170B, and the lower elastic member 160.

Referring to FIG. 2 and FIGS. 5 to 9, the upper elastic member 150 and the lower elastic member 160 may be coupled both to the bobbin 110 and to the housing 140 so as to elastically support the bobbin 110.

For example, the upper elastic member 150 may be coupled to the upper portion (or the upper surface or the upper end) of the bobbin 110 and/or the upper portion (or the upper surface or the upper end) of the housing 140.

The lower elastic member 160 may be coupled to the lower portion (or the lower surface or the lower end) of the bobbin 110 and/or the lower portion (or the lower surface or the lower end) of the housing 140.

Although the upper elastic member 150 is not divided into a plurality of elastic units in FIG. 2, the disclosure is not limited thereto. In another embodiment, the upper elastic member 150 may include a plurality of elastic units, which are spaced apart from each other.

Referring to FIG. 2, the upper elastic member 150 may include a first inner frame 151 coupled to the upper portion of the bobbin 110, a first outer frame 152 coupled to the upper portion of the housing 140, and a first frame connector 153 connecting the first inner frame 151 to the first outer frame 152. Hereinafter, the inner frame may be alternatively referred to as an "inner part", the outer frame may be alternatively referred to as an "outer part", and the frame connector may be alternatively referred to as a "connector".

The first inner frame 151 of the upper elastic member 150 may have formed therein a hole 151a, which is for coupling to the first coupling portion 113 of the bobbin 110, and the first outer frame 152 may have formed therein a hole 152a, which is for coupling to the first coupler 144 of the housing 140.

Referring to FIG. 5, the lower elastic member 160 may include an elastic member, which is divided or separated into two or more, and may be coupled to the bobbin 110. For example, the elastic members may be referred to as "lower elastic members", "elastic units" or "springs".

For example, the lower elastic member 160 may include first and second elastic members 160-1 and 160-2, which are spaced apart from each other, and the first and second elastic members 160-1 and 160-2 may be conductively isolated from each other.

The coil 120 may be conductively connected to the first and second elastic members 160-1 and 160-2. For example, the coil 120 may be coupled at one end (or a first end) thereof to the first elastic member 160-1, and may be coupled at the other end (or a second end) thereof to the second elastic member 160-2.

Each of the first and second lower elastic units 160-1 and 160-2 may include the second inner frame 161 coupled to the lower portion of the bobbin 110, the second outer frame 162 coupled to the lower portion of the housing 140, and the second frame connector 163 connecting the second inner frame 161 to the second outer frame 162.

The second inner frame 161 of the lower elastic member 160 may have therein a hole 161a for coupling to the second coupler 117 of the bobbin 110, and the second outer frame 162 may have therein holes 162a for coupling to the second coupler 147 of the housing 140.

For example, one end of the second inner frame 161 of the first elastic member 160-1 may be provided with a first bonding portion (or a "first bonding region) 15a, to which one end of the coil 120 is coupled, and one end of the second inner frame 161 of the second elastic member 160-2 may be provided with a second bonding portion (or a "second bonding region"), to which the other end of the coil 120 is coupled.

For example, by means of solder or a conductive adhesive member, the one end of the coil 120 may be coupled to the first bonding portion 15a of the inner frame 161 of the first elastic member 160-1, and the other end of the coil 120 may be coupled to the second bonding portion 15b of the inner frame 161 of the second elastic member 160-2.

The reason why the first and second bonding portions 15a and 15b are provided at the second inner frame 161 is to make it easy to perform bonding to the coil 120 because the second inner frame 161 is positioned closer to the bobbin 110 than to the second outer frame 163.

For example, the first and second bonding portions 15a and 15b may have therein guide grooves for guiding the one end and the other end of the coil 120.

In the first and second bonding portions 15a and 15b described above, the term "bonding portion" may be interchangeably used with "pad portion", "connecting terminal", "solder portion", or "electrode portion".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire, or the like.

Each of the first frame connector 153 and the second frame connector 163 of the upper elastic member 150 and the lower elastic member 160 may be bent or curved (or may be formed into a curved line) at least once so as to define a predetermined pattern. The upward and/or downward movement of the bobbin 110 in the first direction may be flexibly (or elastically) supported through changes in position and fine deformation of the first and second frame connectors 153 and 163.

For example, in order to prevent an oscillation phenomenon during movement of the bobbin 110, a damper may be disposed between the first frame connector 153 and the upper surface (for example, the first escape groove 112a) of the bobbin 110. Furthermore, a damper (not shown) may also be disposed between the second frame connector 163 of the lower elastic member 160 and the lower surface (for example, the second escape groove 112b) of the bobbin 110.

For example, a damper may be applied to the coupling portion between each of the bobbin 110 and the housing 140 and the upper elastic member 150 or to the coupling portion between each of the bobbin 110 and the housing 140 and the lower elastic member 160. For example, the damper may be gel-type silicone.

For example, although the first and second elastic members 160-1 and 160-2 may be separated or spaced apart from each other at the first side portion 141-1 and the second side portion 141-2 of the housing 140, the disclosure is not limited thereto.

The first elastic member 160-1 may include a first connecting terminal 164-1, which is connected to the outer surface of the second outer frame 162 of the first elastic member 160-1 and which is bent at the second outer frame 163 of the first elastic member 160-1 and extends toward the base 210.

The second elastic member 160-2 may include a second connecting terminal 164-2, which is connected to the outer surface of the second outer frame 162 of the second elastic member 160-2 and which is bent at the second outer frame 163 of the second elastic member 160-2 and extends toward the base 210.

For example, the first connecting terminal 164-1 of the first elastic member 160-1 may extend toward the first outer surface of the base 210 from the second outer frame 162 of the first elastic member 160-1. The second connecting terminal 164-2 of the second elastic member 160-2 may extend toward the first outer surface of the base 210 from the second outer frame 162 of the second elastic member 160-2.

For example, the first and second connecting terminals 164-1 and 164-2 of the first and second elastic members 160-1 and 160-2 may be disposed on the first outer surface of the base 210 so as to be spaced apart from each other, and may be in contact with the first outer surface of the base 210.

For example, the first connecting terminal 164-1 of the first elastic member 160-1 may be disposed, seated or fitted in a first depression 52a formed in the base 210. Furthermore, the second connecting terminal 164-2 of the second elastic member 160-2 may be disposed, seated or fitted in a second depression 52b formed in the base 210. Here, the depression may be alternatively referred to as a "groove".

The first and second connecting terminals 164-1 and 164-2 of the first and second elastic members 160-1 and 160-2 may be exposed from the base 210, and the first and second connecting terminals 164-1 and 164-2 may be conductively isolated from each other.

For example, the inner surface of the first connecting terminal 164-1, disposed in the first depression 52a in the base 210, may be in contact with one surface (for example, the bottom surface) of the first depression 52a, and the outer surface of the first connecting terminal 164-1 may be exposed from the outer surface (for example, the first outer surface) of the base 210. The outer surface of the first connecting terminal 164-1 may be the surface opposite the inner surface of the first connecting terminal 164-1.

Furthermore, the inner surface of the second connecting terminal 164-2 disposed in the second depression 52b in the base 210 may be in contact with one surface (for example, the bottom surface) of the second depression 52b, and the outer surface of the second connecting terminal 164-2 may be exposed from the outer surface (for example, the first outer surface) of the base 210. The outer surface of the second connecting terminal 164-2 may be the surface opposite the inner surface of the second connecting terminal 164-2.

For example, although the lower end of each of the first and second connecting terminals 164-1 and 164-2 may be exposed from the lower surface of the base 210, the disclosure is not limited thereto. In another embodiment, the lower end of each of the first and second connecting terminals 164-1 and 164-2 may not be exposed from the lower surface of the base 210.

Although the depth of each of the depressions 52a and 52b may be greater than the thickness of each of the connecting terminals 164-1 and 164-2 and the outer surfaces of the connecting terminals 164-1 and 164-2 disposed in the depressions 52a and 52b may not project outwards from the depressions 52a and 52b, the disclosure is not limited thereto. In another embodiment, the outer surfaces of the connecting terminals 164-1 and 164-2 may project outwards from the depressions 52a and 52b.

Referring to FIGS. 4A and 5, the first elastic member 160-1 and the second elastic member 160-2 may be disposed so as to face each other in the first axial direction (for example, in the x-axis direction).

For example, the first elastic member 160-1 may be disposed at one side of the first side portion 218a of the base 210, one side of the second side portion of the base 210, the third side portion of the base 210, the first corner portion 218b1 of the base 210, and the third corner portion of the base 210.

For example, the second side portion of the base 210 may face the first side portion 218a of the base 210 in the second axial direction (for example, in the y-axis direction), and the third side portion of the base 210 may be disposed between the first side portion 218a and the second side portion of the base 210. The first corner portion 218b1 of the base 210 may connect the first side portion 218a of the base 210 to one side of the third side portion of the base 210, and the third corner portion of the base 210 may connect the second side portion of the base 210 to the other side of the third side portion of the base 210. The second axial direction may be perpendicular to the first axial direction.

For example, the second elastic member 160-2 may be disposed at the other side of the first side portion 218a of the base 210, the other side of the second side portion of the base 210, the fourth side portion of the base 210, the second corner portion 218b2 of the base 210, and the fourth corner portion of the base 210.

For example, the fourth side portion of the base 210 may face the third side portion of the base 210 in the first axial direction. The second corner portion 218b2 of the base 210 may connect the first side portion 218a of the base 210 to one side of the fourth side portion of the base 210, and the fourth corner portion of the base 210 may connect the second side portion of the base 210 to the other side of the fourth side portion of the base 210.

For example, the first and second connecting terminals 164-1 and 164-2 and the first to fourth terminals 81 to 84 may be disposed at the first side portion 218a of the base 210.

For example, the first to fourth terminals 81 to 84 may include respective portions 8b1, 9b1, 83b and 84b disposed on the outer surface of the first side portion 218a of the base 210.

The first terminal 81 may be disposed so as to extend toward the first corner portion 218b1 of the base 210, and the second terminal 82 may be disposed so as to extend toward the second corner portion 218b2 of the base 210.

The third terminal 83 and the fourth terminal 84 may be disposed between the first terminal 81 and the second terminal 82.

The first and second connecting terminals 164-1 and 164-2 may be conductively connected to external wires or external devices via conductive adhesive members (for example, solder) so as to allow external power or external drive signals to be supplied thereto.

If the solder bonded to the first and second connecting terminals 164-1 and 164-2 projects from the outer surface of the base 210, the contact or collision between the solder bonded to the first and second connecting terminals 164-1 and 164-2 and the cover member 300 may occur, thereby causing a conductive short or disconnection. In the embodiment, since each of the depressions 52a and 52b has a sufficient depth to prevent the solder bonded to the connecting terminals 164-1 to 164-4 from projecting from the outer surface of the base 210, it is possible to prevent the above-mentioned conductive short or disconnection.

The first and second connecting terminals 164-1 and 164-2 may be disposed at the second outer frames 162 of the first and second elastic members 160-1 and 160-2, which are disposed under the first side portions 141-1 of the housing 140 and/or the corner portions 142-1 and 142-2 of the housing 140 adjacent to the first side portions 141-1.

The bonding portions 15a and 15b, to which the coil 120 is coupled, may be disposed at the first inner frames 151 of the first and second elastic members 160-1 and 160-2 disposed under the side portion of the bobbin 110 that corresponds to the second side portion 141-2 of the housing 140.

As described above, the first and second bonding portions 15a and 15b may be disposed so as to be spaced apart from the first and second connecting terminals 164-1 and 164-2. When the first and second connecting terminals 164-1 and 164-2 are soldered for conductive connection to external components, it is possible to prevent the solder between the coil 120 and the first and second bonding portions 15a and 15b from being melted due to heat generated during the soldering, and it is possible to prevent conductive disconnection between the coil 120 and the first and second elastic members 160-1 and 160-2.

In the above-mentioned first and second connecting terminals 164-1 and 164-2, the term "connecting terminal" may be interchangeably used with "pad portion", "bonding portion", "solder portion" or "electrode portion".

The first and second connecting terminals 164-1 and 164-2 of the first and second elastic members 160-1 and 160-2 may be conductively connected to the coil 120, and power signals or drive signals may be applied to the first and second connecting terminals 164-1 and 164-2 so as to drive the coil 120.

Although the first connecting terminal 164-1 may be integrally formed with the first elastic member 160-1 and the second connecting terminal 164-2 may be integrally formed with the second elastic member 160-2 in FIG. 1, the disclosure is not limited thereto. In another embodiment, the first connecting terminal may be formed separately from the first elastic member, and may be disposed on the first outer surface of the base 210, and the second connecting terminal may be formed separately from the second elastic member, and may be disposed on the first outer surface of the base 210. The first elastic member may be connected to the first connecting terminal via a conductive adhesive (for example, solder), and the second elastic member may be connected to the second connecting terminal via a conductive adhesive (for example, solder).

Next, the base 210 will be described.

The base 210 may be coupled to the housing 140, and may define a reception space for accommodating the bobbin 110 and the housing 140, in conjunction with the cover member 300. The base 210 may have a bore 21 corresponding to the bore in the bobbin 110 and/or the bore in the housing 140, and may have a shape corresponding to or coinciding with that of the cover member 300, for example, a square shape.

The base 210 may include a step 211 at the lower end of the outer surface thereof, to which an adhesive is applied when the cover member 300 is secured to the base 210 via adhesion. Here, the step 211 may guide the cover member 300, which is coupled to the upper side of the base, and may face the lower end of the side plate 302 of the cover member 300. An adhesive member and/or a sealing member may be disposed or applied between the lower end of the side plate 302 of the base 210 and the step 211 of the base 210.

The base 210 may be disposed below the bobbin 110 and the housing 140.

For example, the base 210 may be disposed below the lower elastic member 160.

The base 210 may be provided on the upper surface thereof with projections 216a to 216d, which project toward the housing 140.

The base 210 may include the projections 216a to 216d, which respectively project upwards to a predetermined height from the four corners or corner portions. Here, the projections 216a to 216d of the base 210 may be alternatively referred to as "columns".

For example, although the projections 216a to 216d of the base 210 may have the form of a polygonal column, which projects perpendicularly from the upper surface 211a of the base 210, the disclosure is not limited thereto.

The projections 216a to 216d of the base 210 may be fitted, fastened or coupled to the guide groove 148 in the housing 140 using an adhesive such as epoxy or silicone.

In order to prevent the lower surface or the lower end of the bobbin 110 from directly colliding with the upper surface 211a of the base 210 in the event of an external impact, the base 210 may include a stopper 23 projecting from the upper surface 211a thereof, and the stopper 23 of the base 210 may be disposed so as to correspond to the projections 216a to 216d of the base 210, without being limited thereto.

In order to avoid spatial interference between the bobbin 110 and the lower elastic member 160, the stopper 23 of the base 210 may be positioned higher than the first and second lower elastic units 160-1 and 160-2 (for example, the second frame connectors 163) coupled to the base 210.

The base 210 may have a groove 247 formed in the upper surface 211a thereof, into which the protrusion-shaped second coupler 147 of the housing 140 is seated, fitted or coupled. The groove 247 may correspond to or face the second coupler 147 of the housing 140 in the optical-axis direction, and may be formed in a region of the upper surface of the base 210 that is positioned between each of the projections 216a to 216d of the base 210 and the stopper 23.

The base 210 may include a seating portion 25 formed between the bore 21 and the outer surface of the base 210 in order to receive the second sensing coil 170B therein.

Although the seating portion 25 in the base 210 may be configured to have the form of a groove depressed from the upper surface 211a of the base 210, the disclosure is not limited thereto. The seating portion 25 in the base 210 may have any shape (for example, that of a groove or a protrusion) capable of allowing the second sensing coil 170B surrounding the bore 21 in the base 210 to be disposed therein.

Referring to FIG. 7, the upper surface of the base 210 may be provided with a first groove 31a, in which at least a portion of the first terminal 81 is disposed, a second groove 31b, in which at least a portion of the second terminal 82 is disposed, a third groove 31c, in which at least a portion of the third terminal 83 is disposed, and a fourth groove 31d, in which at least a portion of the fourth terminal 31d is disposed.

For example, the first to fourth grooves 31a to 31d may be formed between the bore 21 in the base 210 and the outer surface of the base 210. Here, the outer surface of the base 210 may be the outer surface of the first side portion of the base 210 that corresponds to the first side portion 141-1 of the housing 140 in the optical-axis direction or in the first direction. Alternatively, the outer surface of the base 210 may be the outer surfaces of the first side portion 218a and the first and second corner portions 218b1 and 218b2 of the base 210, which correspond to the first side portion 141-1 and the first and second corner portions 142-1 and 142-2 of the housing 140 in the optical-axis direction or in the first direction.

The base 210 may include side portions that correspond to the side portions 141-1 to 141-4 of the housing 140 and corner portions that correspond to the corner portions 142-1 to 142-4 of the housing 140.

For example, the base 210 may include the side portion (for example, 218a), which corresponds to or faces the side portion (for example, 141-1) of the housing 140, and the corner portions (for example, 218b1 and 218b2), which correspond to or face the corner portions (for example, 142-1 and 142-2) of the housing 140.

For example, the first and second depressions 52a and 52b may be formed in the outer surface of the first side portion (for example, 218a) of the base 210.

For example, each of the first and second depressions 52a and 52b may have an upper opening, formed in the upper surface of the base 210, and a lower opening, formed in the lower surface of the base 210.

Next, the first terminal 81 and the second terminal 82 will be described.

Referring to FIG. 9, the first terminal 81 may be disposed at the base 210, and may be coupled or connected to the base 210 or supported by the base 210. For example, the first terminal 81 may be disposed at the first side portion 218a and the first corner portion 218b1 of the base 210.

The first terminal 81 may include a body 81a and an extension 81b extending from the body 81a.

For example, the first terminal 81 may include the body 81a, disposed at the first side portion of the base 210, and the extension 81b, which extends from the body 81a and is coupled to one end of the first sensing coil 170A.

A portion of the body 81a may be exposed from the upper surface of the base 210, and the remaining portion of the body 81a may be bent at the portion of the body 81a. At least a portion of the remaining portion of the body 81a may be exposed from the side surface (or the first outer surface 208) of the base 210.

The body 81a may include a first portion 8a1 and a second portion 8b1.

For example, the first portion 8a1 of the first terminal 81 may be exposed from the upper surface of the base 210. In another embodiment, the first portion 8a1 of the first terminal 81 may be disposed in the base 210, without being exposed from the upper surface of the base 210.

The second portion 8b1 of the first terminal 81 may be connected to one end of the first portion 8a1, and may be bent at one end of the first portion 8a1 toward the lower surface of the base 210 or the side surface (or the first outer surface) of the base 210.

The width W2 of the other end of the first portion 8a1 of the first terminal 81 may be less than the width W11 of one end of the first portion 8a1 (W2<W11).

For example, the body 81a of the first terminal 81 may include a bent portion 8a11 connecting the first portion 8a1 to the second portion 8b1. Although the bent portion 8a11 may be configured to have a round shape, the disclosure is not limited thereto. In another embodiment, the bent portion 8a11 may be configured to have an angled shape.

For example, the bent portion 8a11 may be disposed in the base 210, and may not be exposed from the base 210.

Although the included angle between the first portion 8a1 and the second portion 8b1 may be a right angle, the disclosure is not limited thereto. In another embodiment, the included angle may be an acute angle or an obtuse angle.

For example, the second portion 8b1 of the first terminal 81 may be bent at a region of the first portion 8a1, and may extend downwards therefrom.

Although the width W11 of the first portion 8a1 of the first terminal 81 may be greater than the width W12 of the second portion 8b1 of the first terminal 81 (W11>W12), the disclosure is not limited thereto. In another embodiment, the width of the first portion 8a1 of the first terminal 81 may be the same as the width of the second portion 8b1.

The extension 81b may extend toward the first corner portion 218b1 of the base 210 from one side of the body 81a.

For example, the extension 81b may extend toward the first corner portion 218b of the base 210 from the first portion 8a1 of the body 81a.

For example, the extension 81b may extend toward the first corner of the base 210 from one side of the first portion 8a1 of the body 81a. Here, the first corner of the base 210 may be a corner adjacent to the first side portion of the base.

The extension portion 81b may include at least one of horizontal extending portions Q1, Q2 and Q4 extending in a horizontal direction, a vertical extending portion Q3 extending in the optical-axis direction, and bent portions B1 to B3. Here, the horizontal direction may include a first horizontal direction Y1, which is parallel to a plane perpendicular to the optical axis OA and is directed toward the first corner portion 218b1 of the base 210 from the first portion 8a1 of the first terminal 81. Furthermore, the horizontal direction may further include a second horizontal direction Y2, which is parallel to a plane perpendicular to the optical axis OA and is perpendicular to the first horizontal direction Y1 and which is directed toward the outer surface 208 of the base 210. In addition, the horizontal direction may further include a direction (not shown), which is parallel to a plane perpendicular to the optical axis OA and is inclined at a predetermined angle with respect to the first horizontal direction Y1.

For example, the extension 81b of the first terminal 81 may include the first extending portion Q1, which extends from one side surface of the first portion 8a1 in the first horizontal direction, the first bent portion B1, which is bent at the first extending portion Q1 toward the outer surface of the first side portion 218a of the base 210, the second extending portion Q2, which extends from the first bent portion B1 in the second horizontal direction Y2, the second bent portion B2, which is bent upwards at the second extending portion Q2, the third extending portion Q3, which extends upwards from the second bent portion B2, the third bent portion B3, which is bent at the third extending portion Q3 in the second horizontal direction Y2, and the fourth extending portion Q4, which is bent at the third bent portion B3 in the second horizontal direction Y2.

The extension 81b may be disposed in the base 210, and at least a portion of the extension 81b may be exposed from the base 210. For example, the extension 81b may be disposed in the base 210, and the distal end or one end (for example, Q4) of the extension 81b may be exposed from the base 210.

For example, the extension 81b may be disposed in the first side portion 218a and the first corner portion 218b1 of the base 210. A portion of the extension 81b may be disposed in the first projection 216a, disposed at the first corner portion 218b1 of the base 210, and the distal end (or one end) Q4 of the extension 81b may be exposed from the upper surface of the first projection 216a.

By means of solder or a conductive adhesive member, one end 170a1 (see FIG. 10A) of the first sensing coil 170A may be coupled to the distal end (or one end) Q4 of the extension 81b exposed from the base 210.

The extension 81b of the first terminal 81 may extend for conductive coupling to one end 170a1 of the first sensing coil 170A, and may be disposed in the first projection 216a. Consequently, it is possible to increase the force of coupling with the base 210 and to protect the extension 81b from impacts or pressure.

The first portion 8a1 of the first terminal 81 may include a first region S1, which is connected to the second portion 8b1, and a second region S2, which is connected to one side of the first region S1 and is spaced apart from the second portion 8b1.

For example, although the second region S2 of the first portion 8a1 may have a rectangular shape when viewed from above, the disclosure is not limited thereto. In another embodiment, the second region S2 may have a trapezoidal shape, without being limited thereto.

The width W2 of the second region S2 may be less than the width W11 of the first region S1. For example, the width W11 of the first region S1 may be greater than the width W12 of the second portion 8b1 (W11>W12). In another embodiment, the width W11 of the first region S1 may be equal to the width W12 of the second portion 8b1 (W11=W12), or the width W11 of the first region S1 may be less than the width W12 of the second portion 8b1 (W11<W12).

The first portion 8a1 of the first terminal 81 may include the second region S2, the width of which decreases with increasing distance from the first region S1.

The width W2 of the extension 81b of the first terminal 81 may be less than the width W11 of the first region S1 of the first portion 8a1 (W3<W11). Furthermore, the width W3 of the extension 81b of the first terminal 81 may be greater than or equal to the width W2 of the second region S2 of the first portion 8a1 (W3 W2).

Although the width W3 of the extension 81b may be less than the width W12 of the second portion 8b1 of the first terminal 81 (W3<W12), the disclosure is not limited thereto. In another embodiment, the width W3 of the extension 81b may be equal to or greater than the width W12 of the second portion 8b1 of the first terminal 81 (W3 W2).

By virtue of the second region S2 of the first terminal 81, it is possible to increase the contact or coupling area between the first terminal 81 and the base 210 and thus to increase the coupling force between the first terminal 81 and the base 210.

The second terminal 82 may be disposed at the base 210, may be coupled or connected to the base 210, or may be supported by the base 210. For example, the second terminal 82 may be disposed at the first side portion 218a and the second corner portion 218b2 of the base 210.

The second terminal 82 may include a body 82a and an extension 82b extending from the body 82a.

For example, the second terminal 82 may include the body 82a, disposed at the first side portion of the base 210, and the extension 82b, which extends from the body 82a and is coupled to the other end of the first sensing coil 170A.

A portion of the body 82a of the second terminal 82 may be exposed from the upper surface of the base 210, and the remaining portion of the body 82a may be bent at a portion of the body 82a. At least a portion of the remaining portion of the body 82a may be exposed from the side surface (or the first side surface) 208 of the base 210.

The body 82a of the second terminal 82 may include a first portion 9a1 and a second portion 9b1.

For example, the first portion 9a1 of the second terminal 82 may be exposed from the upper surface of the base 210. In another embodiment, the first portion 9a1 of the second terminal 82 may be disposed in the base 210, rather than being exposed from the upper surface of the base 210.

The second portion 9b1 of the second terminal 82 may be connected to one end of the first portion 9a1, and may be bent at the one end of the first portion 9a1 and extend toward the lower surface or the side surface (or the first outer surface) of the base 210.

The width of the other end of the first portion 9a1 of the second terminal 82 may be less than the width W4 of the one end of the first portion 9a1.

For example, the body 82a of the second terminal 82 may further include a bent portion 9a11 connecting the first portion 9a1 to the second portion 9b1. Although the bent portion 9a11 may have a round shape, the disclosure is not limited thereto. In another embodiment, the bent portion 9a11 may have an angled shape.

For example, the bent portion 9a11 may be disposed in the base 210, without being exposed from the base 210.

For example, although the included angle between the first portion 9a1 and the second portion 9b1 of the second terminal 82 may be a right angle, the disclosure is not limited thereto. In another embodiment, the included angle may be an acute angle or an obtuse angle.

For example, the second portion 9b1 of the second terminal 82 may be bent at a region of the first portion 9a1, and may extend downwards therefrom.

Although the width W4 of the first portion 9a1 of the second terminal 82 may be greater than the width of the second portion 9b1 of the second terminal 82, the disclosure is not limited thereto. In another embodiment, the width of the first portion 9a1 of the second terminal 82 may be the same as the width of the second portion 9b1.

The extension 82b of the second terminal 82 may extend toward the second corner portion 218b2 of the base 210 from one side from the body 82a.

For example, the extension 82b of the second terminal 82 may extend toward the second corner portion 218b2 of the base 210 from the first portion 9a1 of the body 82a.

For example, the extension 82b may extend toward the second corner of the base 210 from one side of the first portion 9a1 of the body 82a. Here, the second corner of the base 210 may be another corner adjacent to the first side portion of the base 210.

The extension 81b of the second terminal 82 may include at least one of horizontal extending portions p1, P2 and P4 extending horizontally, a vertical extension P3 extending in the optical-axis direction, and bent portions B4 to B6. Here, the horizontal direction may include a third horizontal direction Y3, which is parallel to a plane perpendicular to the optical axis OA and is directed toward the second corner portion 218b2 of the base 210 from the first portion 9a1 of the second terminal 82, and the second horizontal direction Y2. Furthermore, the horizontal direction may further include a direction (not shown), which is parallel to a plane perpendicular to the optical axis OA and is inclined at a predetermined angle with respect to the first horizontal direction Y1.

For example, the extension 82b of the second terminal 82 may include the first extending portion P1, which extends from one side surface of the first portion 9a1 in the third horizontal direction Y3, the first bent portion B4, which is bent at the first extending portion P1 and extends toward the outer surface of the first side portion 218a of the base 210, the second extending portion P2, which extends from the first bent portion B4 in the second horizontal direction Y2, the second bent portion B5, which is bent at the second extending portion P2 and extends upwards, the third extending portion P3, which extends upwards from the second bent portion B5, the third bent portion B6, which is bent at the third extending portion P3 and extends in the second horizontal direction Y2, and the fourth extending portion P4, which extends from the third bent portion B6 in the second horizontal direction Y2.

The extension 82b of the second terminal 82 may be disposed in the base 210, and at least a portion of the extension 82b may be exposed from the base 210. For example, the extension 82b of the second terminal 82 may be disposed in the base 210, and the distal end or one end (for example, P4) of the extension 82b may be exposed from the base 210.

For example, the extension 82b of the second terminal 82 may be disposed in the first side portion 218a and the second corner portion 218b2 of the base 210, and a portion of the extension 82b may be disposed in the second projection 216b, disposed at the second corner portion 218b2 of the base 210. The distal end (or one end) p4 of the extension 82b may be exposed from the upper surface of the second projection 216b.

By means of solder or a conductive adhesive member, the other end 170a2 (see FIG. 10A) of the first sensing coil 170A may be coupled to the distal end (or one end) P4 of the extension 82b of the second terminal 82 exposed from the base 210.

Since the extension 82b of the second terminal 82 is disposed in the second projection 216b of the base 210 so as to be conductively coupled to the other end 170a2 of the first sensing coil 170A, it is possible to increase the force of coupling with the base 210, and it is possible to protect the extension 82b from impacts or pressure.

The first terminal 81 may include the portion Q4, which is exposed from the upper surface of the first projection 216a and is coupled to one end of the first sensing coil 170A, and the second terminal 82 may include the portion P4, which is exposed from the upper surface of the second projection 216b and is coupled to the other end of the first sensing coil 170A.

The first portion 9a1 of the second terminal 82 may include a first region S3, which is connected to the second portion 9b1, and a second region S4, which is connected to one side of the first region S3 and is spaced apart from the second portion 9b1.

For example, although the second region S4 of the first portion 9a1 may have a rectangular shape when viewed from above, the disclosure is not limited thereto. In another embodiment, the second region S4 may have a trapezoidal shape, without being limited thereto.

The width of the second region S4 of the second terminal 82 may be less than the width W4 of the first region S3. For example, the width W4 of the first region S3 of the second terminal 82 may be greater than the width of the second portion 9b1. In another embodiment, the width W4 of the first region S3 of the second terminal 82 may be equal to or less than the width of the second portion 9b1 of the second terminal 82.

The first portion 9a1 of the second terminal 82 may include the second region S4, the width of which decreases with increasing distance from the first region S3.

The width W5 of the extension 82b of the second terminal 82 may be less than the width W4 of the first region S3 of the first portion 9a1 of the second terminal 82 (W5<W4). The width W5 of the extension 82b of the second terminal 82 may be greater than or equal to the width of the second region S4 of the first portion 9a1 of the second terminal 82.

Although the width W5 of the extension 82b of the second terminal 82 may be less than the width of the second portion 9b1 of the second terminal 82, the disclosure is not limited thereto. In another embodiment, the width W5 of the extension 82b of the second terminal 82 may be greater than or equal to the width of the second portion 9b1 of the second terminal 82.

By virtue of the second region S4 of the second terminal 82, it is possible to increase a contact or coupling area between the second terminal 82 and the base 210 and thus to increase the coupling force between the second terminal 82 and the base 210.

For example, although the first terminal 81 and the second terminal 82 may be configured to have shapes that are symmetrical with each other with respect to the third and fourth terminals 83 and 84, the disclosure is not limited thereto. Furthermore, although the first terminal 81 and the second terminal 82 may be disposed so as to be symmetrical with each other with respect to the third and fourth terminals 83 and 84, the disclosure is not limited thereto.

The first and second terminals 81 and 82 may be disposed at the two sides of the first side portion of the base 210.

The third and fourth terminals 83 and 84 may be disposed at the base 210, may be coupled or connected to the base 210, or may be supported by the base 210.

For example, the third and fourth terminals 83 and 84 may be disposed at the first side portion 218a of the base 210, and may be disposed between the first terminal 81 and the second terminal 82.

The third and fourth terminals 83 and 84 may have the same shape. In another embodiment, the third and fourth terminals 83 and 84 may have different shapes. Hereinafter, the description of the third terminal 83 may be applied to the fourth terminal 84 with or without modification.

The third terminal 83 may include a first portion 83a and a second portion 83b, and the fourth terminal 84 may include a first portion 84a and a second portion 84b.

At least a portion of the upper surface of the first portion 83a of the third terminal 83 may be exposed from the upper surface of the base 210. By means of solder or a conductive adhesive member 71 (see FIG. 10A), one end 170b1 (see FIG. 10A) of the second sensing coil 170B may be coupled to at least a portion of the upper surface of the first portion 83a of the third terminal 83, which is exposed from the upper surface of the base 210.

Furthermore, at least a portion of the upper surface of the first portion 84a of the fourth terminal 84 may be exposed from the upper surface of the base 210. By means of solder or a conductive adhesive member 72 (see FIG. 10A), the other end 170b2 (see FIG. 10A) of the second sensing coil 170B may be coupled to at least a portion of the upper surface of the first portion 84a of the fourth terminal 84, which is exposed from the upper surface of the base 210.

The second portion 83b of the third terminal 83 may be connected to the first portion 83a, and may be bent at the first portion 83a and extend toward the lower surface or the side surface (or the first outer surface) of the base 210.

For example, the third terminal 83 may include a bent portion 83c connecting the first portion 83a to the second portion 83b, and the fourth terminal 84 may include a bent portion 84c connecting the first portion 84a to the second portion 84b. Although each of the bent portions 83c and 84c of the third and fourth terminals 83 and 84 may have a round shape, the disclosure is not limited thereto. In another embodiment, the bent portion may have an angled shape.

The bent portion 83c of the third terminal 83 may be disposed in the base 210, without being exposed from the base 210.

For example, although the included angle between the first portion 83a and the second portion 83b of the third terminal 83 may be a right angle, the disclosure is not limited thereto. In another embodiment, the included angle between the first portion and the second portion of the third terminal may be an acute angle or an obtuse angle.

For example, the second portion 83*b* of the third terminal 83 may be bent at a region of the first portion 83*a*, and may extend downwards therefrom.

The first portion 83*a* of the third terminal 83 may include a first region S5 having the same width as the second portion 83*b*, and the first portion 84*a* of the fourth terminal 84 may include a first region S7 having the same width as the second portion 84*b*.

For example, the width W21 of the first region S5 of the third terminal 83 may be equal to the width W22 of the second portion 83*b* of the third terminal 83 (W21=W22). In another embodiment, the width of the first region S5 of the third terminal 83 may be greater or less than the width of the second portion 83*b* of the third terminal 83. The first region S5 of the third terminal 83 may be a region that is adjacent to or abuts the second portion 83*b* of the third terminal 83.

The third terminal 83 may further include a second region S6, the width of which decreases with increasing distance from the first region S5, and the fourth terminal 84 may further include a second region S7, the width of which decreases with increasing distance from the first region S7.

The second region S6 of the third terminal 83 may be spaced apart from the second portion 83*b* of the third terminal 83. For example, the width W6 of the second region S6 of the third terminal 83 may be less than the width W21 of the first region S5 of the third terminal 83 (W6<W21).

For example, although the second region S6 of the first portion 83*a* of the third terminal may have a rectangular shape when viewed from above, the disclosure is not limited thereto. The second region may have a trapezoidal shape, without being limited thereto.

For example, the width W21 of the first region S5 of the third terminal 83 may be less than the width W11 of the first region S1 of the first terminal 81 (W21<W11). In another embodiment, the width of the first region S5 of the third terminal 83 may be equal to or greater than the width of the first region S1 of the first terminal 81.

By virtue of the second region S6 of the third terminal 83, it is possible to increase the contact or coupling area between the third terminal 83 and the base 210 and thus to increase the coupling force between the third terminal 83 and the base 210.

For example, the first portion 8*a*1 of the first terminal 81, the first portion 9*a*1 of the second terminal 82, the first portion 83*a* of the third terminal 83, and the first portion 84*a* of the fourth terminal 84 may overlap the second sensing coil 170B in the optical-axis direction.

For example, at least a portion of at least one of the first region S1 of the first portion 8*a*1 of the first terminal 81, the first region S3 of the first portion 9*a*1 of the second terminal 82, the first region S5 of the first portion 83*a* of the third terminal 83, and the first region of the first portion 84*a* of the fourth terminal 84 may overlap the second sensing coil 170B in the optical-axis direction.

At least a portion of the extension 81*b* of the first terminal 81 and at least a portion of the extension 82*b* of the second terminal 82 may overlap the second sensing coil 170B in the optical-axis direction.

The second portion 8*b*1, 9*b*1, 83*b* and 84*b* of the first to fourth terminals 81 to 84 may not overlap the second sensing coil 170B in the optical-axis direction.

For example, the first and second connecting terminals 164-1 and 164-2 may not overlap the second sensing coil 170B in the optical-axis direction.

For example, the second portions 8*b*1, 9*b*1, 83*b* and 84*b* of the first to fourth terminals 81 to 84 and the first and second terminals 164-1 and 164-2 may be positioned outside the second sensing coil 170B. Here, the outside of the second sensing coil 170B may be the side opposite the center of the base 210 with respect to the second sensing coil 170B.

Although the thickness of the first portions 8*a*1 and 9*a*1, the thickness of the second portions 8*b*1 and 9*b*1 and the thickness of the extensions 81*b* and 82*b* of the first and second terminals 81 and 82 are the same, the disclosure is not limited thereto. At least one of the thickness of the first portions 8*a*1 and 9*a*1, the thickness of the second portions 8*b*1 and 9*b*1 and the thickness of the extensions 81*b* and 82*b* of the first and second terminals 81 and 82 may be different from the others.

Furthermore, although the thickness of the first portions 83*a* and 84*a* of the third and fourth terminals 83 and 84 and the thickness of the second portions 83*b* and 84*b* of the third and fourth terminals 83 and 84 may be the same, the disclosure is not limited thereto. The thickness of the first portions 83*a* and 84*a* of the third and fourth terminals 83 and 84 and the thickness of the second portions 83*b* and 84*b* of the third and fourth terminals 83 and 84 may be different from each other.

Although the thicknesses of the first to fourth terminals 81 to 84 may be the same, the disclosure is not limited thereto. In another embodiment, the thickness of at least one of the first to fourth terminals 81 to 84 may be different from that of the others.

Figure 10A:
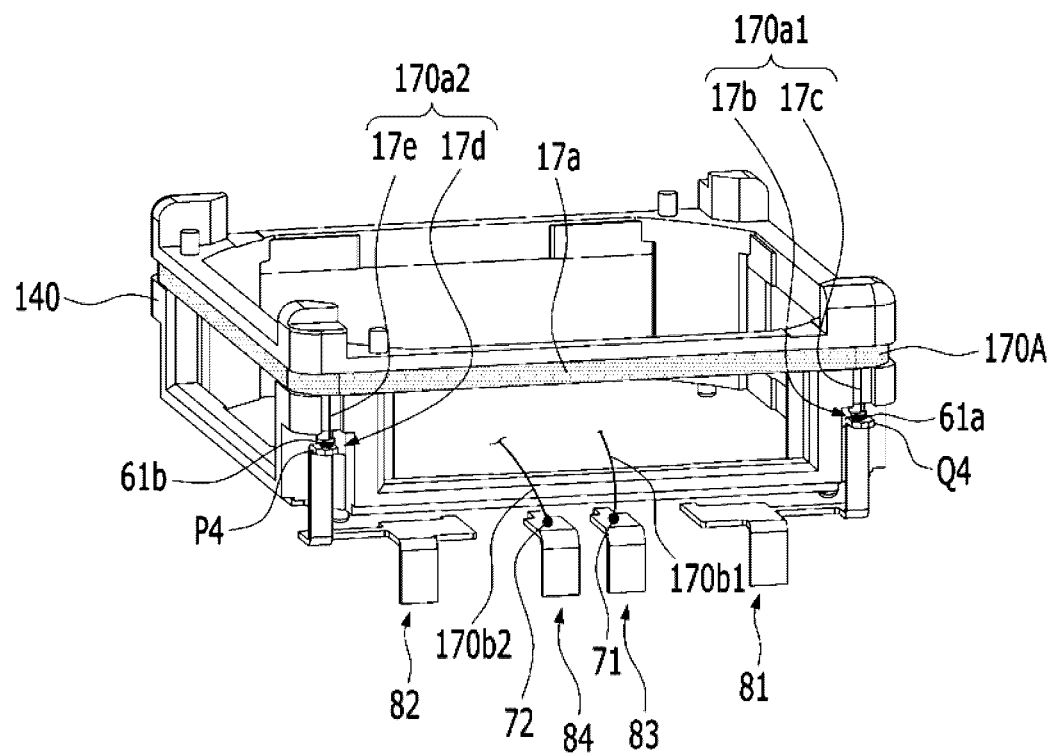
FIG. 10A is a perspective view of the first sensing coil disposed at the housing and the first to fourth terminals.

Referring to FIGS. 6 and 10A, the first solder 71 may couple the upper surface of the first portion 83*a* of the third terminal 83 to one end 170*b*1 of the second sensing coil 170B. By means of the solder 71, the one end 170*b*1 of the second sensing coil 170B may be coupled to at least one of the first region S5 and the second region S6 of the first portion 83*a* of the third terminal 83.

For example, the one end 170*b*1 of the second sensing coil 170B may be coupled to the first region S5 of the first portion 83*a* of the third terminal 83 via the first solder 71.

For example, the second solder 72 may couple the upper surface of the first portion 84*a* of the fourth terminal 84 to the other end 170*b*2 of the second sensing coil 170B. By means of the second solder 72, the other end 170*b*2 of the second sensing coil 170B may be coupled to at least one of the first and second regions of the first portion 84*a* of the fourth terminal 84. For example, the other end 170*b*2 of the second sensing coil 170B may be coupled to the first region S7 of the first portion 84*a* of the fourth terminal 84 via the second solder 72.

In another embodiment, conductive adhesive may be used in place of the first and second solders 71 and 72.

The base 210 may be manufactured through injection molding, and at least a portion of each of the first to fourth terminals 81 to 84 may be positioned in the base 210 through an insert injection molding process. For this reason, each of the first to fourth terminals 81 to 84 may be referred to as an "insert terminal".

However, at least a portion of the upper surface of the first portion 83*a* of each of the third and fourth terminals 83 and 84 may be exposed from the upper surface of the base 210 so as to be coupled to the second sensing coil 170B by soldering.

Furthermore, the distal end Q4 of the extension 81*b* of the first terminal 81 may be exposed from the upper surface of the first projection 216a of the base 210 so as to be coupled to one end 170a1 of the first sensing coil 170A by soldering. The distal end P4 of the extension 82b of the second terminal 82 may be exposed from the upper surface of the second projection 216b of the base 210 so as to be coupled to the other end 170a2 of the first sensing coil 170A by soldering.

At least a portion of the second portions 8b1, 9b1, 83b and 84b of the first to fourth terminals 81 to 84 may be exposed from the outer surface 208 of the base 210 for conductive connection to external components (via, for example, soldering). For example, the outer surfaces of the second portions 8b1, 9b1, 83b and 84b of the first to fourth terminals 81 to 84 may be exposed from the outer surface 208 of the base 210.

Each of the first to fourth terminals 81 to 84 may be made of, for example, metal. For example, although each of the first to fourth terminals 81 to 84 may be made of copper, gold, silver or nickel or an alloy including at least one thereof, the disclosure is not limited thereto.

In the first to fourth terminals, the term "terminal" may be interchangeably used with "pad", "pad portion", "connecting terminal portion", "solder portion" or "electrode portion".

Referring to FIGS. 6 to 9, the first outer surface 208 of the base 210 may be provided with a projection 51, which projects from the bottoms of the first and second depressions 52a and 52b in a direction toward the first outer surface 208 of the base 210 from the center of the bore 21 in the base 210.

For example, the projection 51 may be disposed between the first depression 52a and the second depression 52b.

For example, the bent portions 83c and 84c of the third and fourth terminals 83 and 84 may be positioned in the projection 51a of the base 210. Since the bent portions 83c and 84c of the third and fourth terminals 83 and 84 are positioned in the projection 51, it is possible to protect the bent portions 83c and 84c of the third and fourth terminals 83 and 84 from external impacts and thus to increase the coupling force between the bent portions 83c and 84c and the base 210.

For example, a region of each of the second portions 83b and 84b of the third and fourth terminals 83 and 84 that is exposed from the first outer surface 208 of the base 210 may be positioned under the projection 51. Consequently, it is possible to easily perform soldering between terminals of a circuit board of a camera module and the third and fourth terminals 83 and 84 of the lens moving apparatus 100 according to the embodiment.

The first connecting terminal 164-1 of the first elastic member 160-1, the second connecting terminal 164-2 of the second elastic member 160-2, and the second portions 8b1, 9b1, 83b and 84b of the first to fourth terminals 81 to 84 may be disposed at one side portion (for example, 218a) of the base 210.

For example, the first connecting terminal 164-1, the second connecting terminal 164-2, and the second portions 8b1, 9b1, 83b, 84b of the first to fourth terminals 81 to 84 may be disposed on the first outer surface 208 of the base 210. Consequently, it is possible to easily perform a soldering process of conductively connecting the first connecting terminal 164-1, the second connecting terminal 164-2 and the first to fourth terminals 81 to 84 to an external device (for example, a circuit board).

For example, the first connecting terminal 164-1 and the second connecting terminal 164-2 may be disposed or arranged in the space between the second portion 8b1 of the first terminal 81 and the second portion 9b1 of the second terminal 82.

For example, the second portion 83b of the third terminal 83 and the second portion 84b of the fourth terminal 84 may be disposed or arranged in the space between the first connecting terminal 164-1 and the second connecting terminal 164-2.

For example, a portion of each of the first to fourth terminals 81 to 84 may be disposed on the first outer surface of the base 210, and a portion of each of the third and fourth terminals 83 and 84 disposed on the first outer surface of the base 210 may be disposed between a portion of the first terminal 81 and a portion of the second terminal 82, which are disposed on the first outer surface of the base 210.

For example, when the first outer surface of the base 210 is viewed from the front, the first connecting terminal 164-1, the first terminal 81, the third terminal 83, the fourth terminal 84, the third connecting terminal 164-2 and the second terminal 82 may be sequentially disposed in that order in a direction toward the second corner portion 216b from the first corner portion 216a of the base 210.

For example, when the first outer surface of the base 210 is viewed from the front, the first connecting terminal 164-1, the second portion 8b1 of the first terminal 81, the second portion 83b of the third terminal 83, the second portion 84b of the fourth terminal 84, the third connecting terminal 164-2, and the second portion 9b1 of the second terminal 82 may be sequentially disposed in a direction toward the second corner portion 216b from the first corner portion 216a of the base 210.

Next, the first sensing coil 170A and the second sensing coil 170B will be described.

The first sensing coil 170A may be positioned above the coil 120, and may be disposed at the housing 140. The second sensing coil 170B may be positioned under the coil 120, and may be disposed at the base 210. In another embodiment, the second sensing coil may be disposed at the housing so as to be positioned under the coil 120.

The first sensing coil 170A and the second sensing coil 170B may together constitute a "sensing unit" for detecting displacement of the AF operation unit.

Figure 10B:
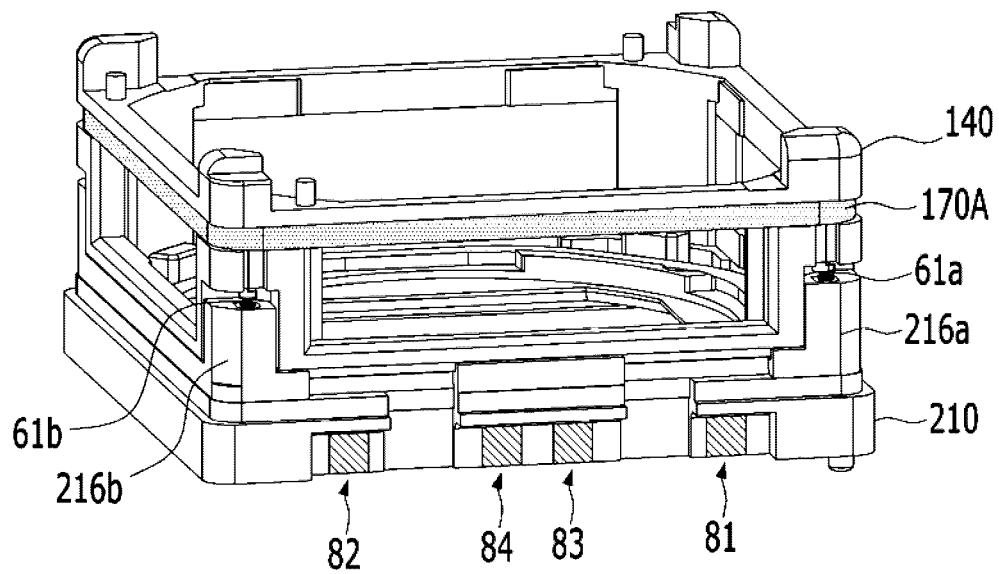
FIG. 10B is a perspective view of the first sensing coil disposed at the housing and the first to fourth terminals disposed at the base.
Figure 11:
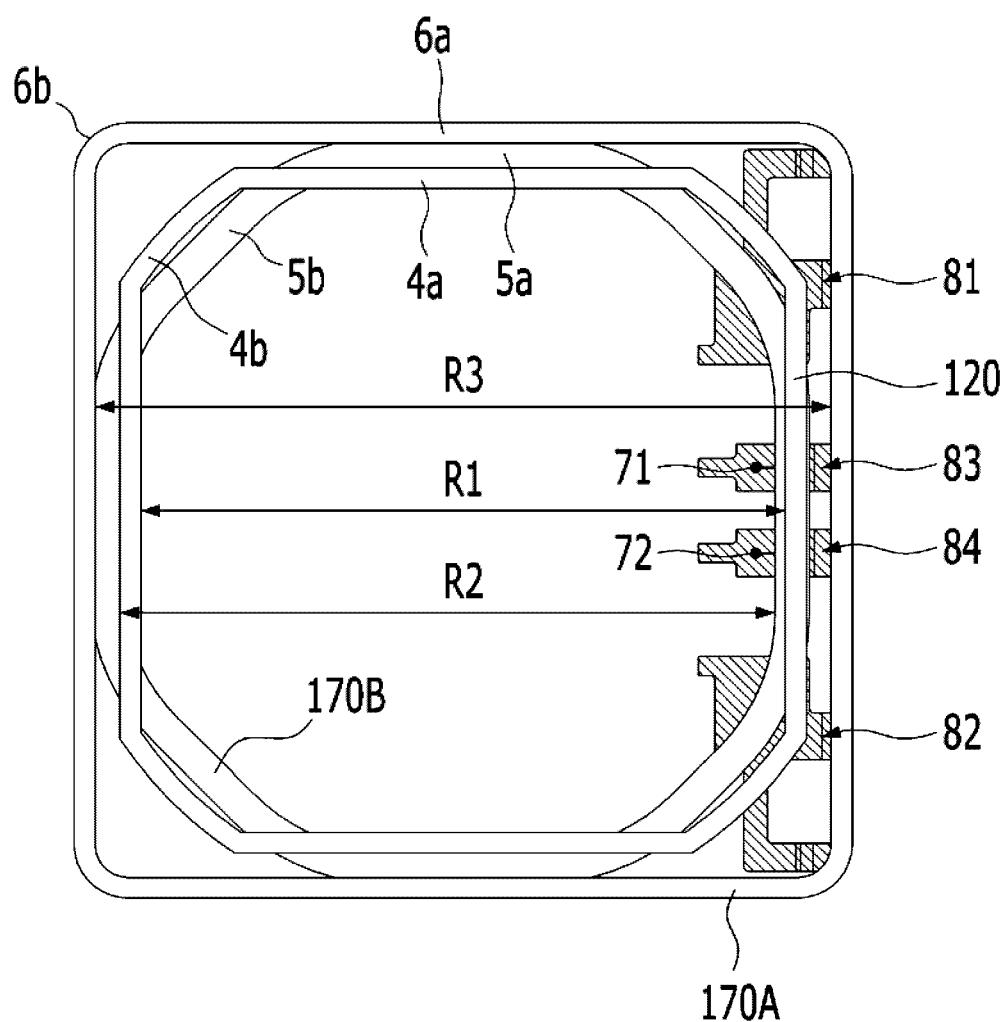
FIG. 11 is a plan view of the coil, the first sensing coil, the second sensing coil and the first to fourth terminals.
Figure 12:
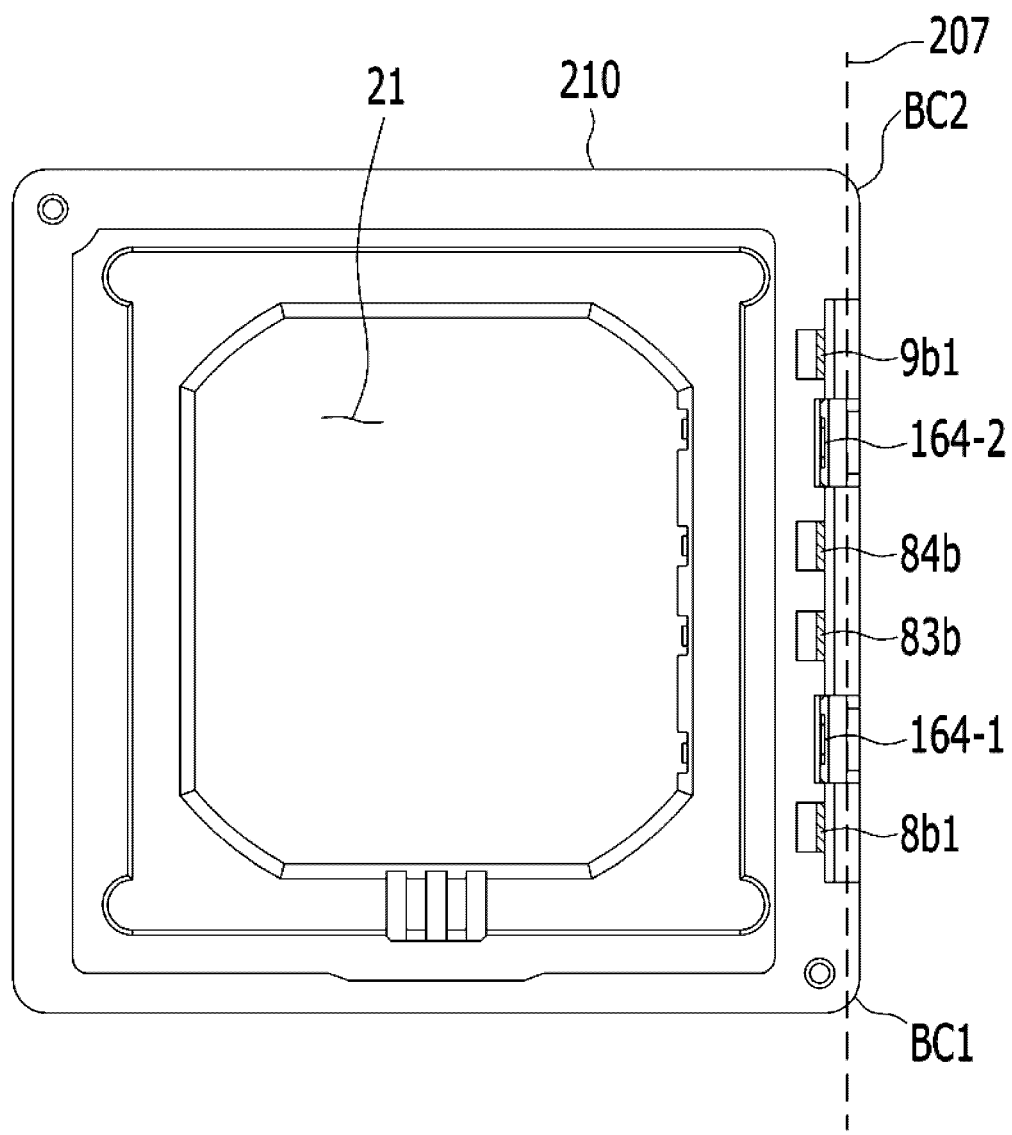
FIG. 12 is a bottom view of FIG. 9.
Figure 13:
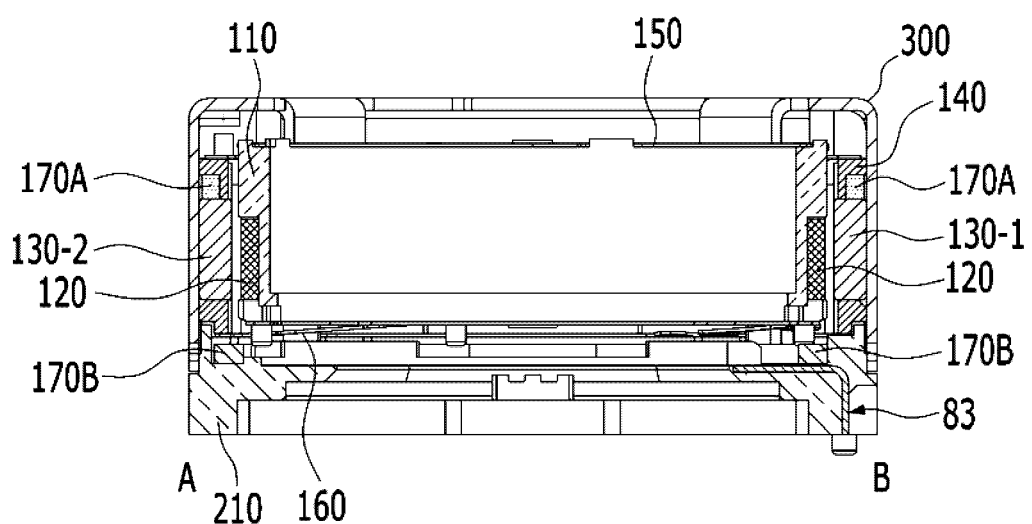
FIG. 13 is a cross-sectional view of the lens moving apparatus taken along line A-B in FIG. 2.
Figure 14:
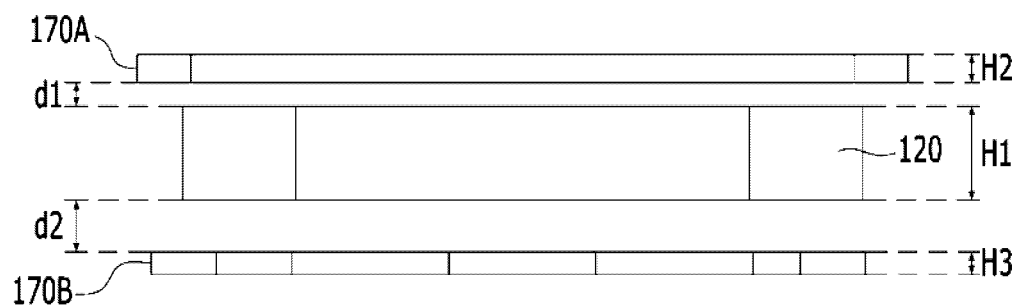
FIG. 14 is a view illustrating the distance between the first sensing coil, the coil and the second sensing coil.

FIG. 10A is a perspective view of the first sensing coil 170A disposed at the housing 140 and the first to fourth terminals 81 to 84. FIG. 10B is a perspective view of the first sensing coil 170A disposed at the housing 140 and the first to fourth terminals 81 to 84 disposed at the base 210. FIG. 11 is a plan view of the coil 120, the first sensing coil 170A, the second sensing coil 170B, and the first to fourth terminals 81 to 84. FIG. 12 is a bottom view of FIG. 9. FIG. 13 is a cross-sectional view of the lens moving apparatus 100 taken along line A-B in FIG. 2. FIG. 14 is a view illustrating the distance between the first sensing coil 170A, the coil 120 and the second sensing coil 170A.

Referring to FIGS. 10A to 14, each of the first sensing coil 170A and the second sensing coil 170B is intended to detect displacement of the AF operation unit.

The first sensing coil 170A may be disposed under the upper elastic member 150 but above the coil 120. For example, the magnet 130 may be disposed under the first sensing coil 170A.

The second sensing coil 170B may be disposed under the lower elastic member 160.

For example, the second sensing coil 170B may be disposed between the lower elastic member 160 and the base 210. For example, the second sensing coil 170B may be disposed in the seating portion 25 in the base 210. In another embodiment, the second sensing coil may be disposed on the outer surface of the base in the state of being wound around the outer surface. In this case, the outer surface of the base may be provided therein with a groove or a mounting groove, along which the second sensing coil is wound.

For example, although at least a portion of the second sensing coil 170B may be in contact with the first portions 8a1, 9a1, 93a and 84a of the first to fourth terminals 81 to 84, the disclosure is not limited thereto. In another embodiment, the second sensing coil 170B may be spaced apart from the first portions 8a1, 9a1, 93a and 84a of the first to fourth terminals 81 to 84, rather than being in contact therewith.

The first sensing coil 170A may generate first induction voltage resulting from mutual induction with the coil 120 to which a drive signal is supplied, and the second sensing coil 170B may generate second induction voltage resulting from mutual induction with the coil 120.

For example, the first sensing coil 170A may be disposed above the periphery of the bobbin 110, and the second sensing coil 170B may be disposed under the periphery of the bobbin 110.

For example, although the ring portion of the first sensing coil 170A may not overlap the bobbin 110 in the optical-axis direction, the disclosure is not limited thereto. In another embodiment, a portion of the ring portion of the first sensing coil 170A may overlap the bobbin in the optical-axis direction.

Referring to FIG. 11, for example, the ring portion of the first sensing coil 170A may not overlap the ring portion of the coil 120. In another embodiment, the ring portion of the first sensing coil 170A may overlap the ring portion of the coil 120.

Although at least a portion of the ring portion of the first sensing coil 170A may overlap the magnets 130-1 to 130-4 in the optical-axis direction, the disclosure is not limited thereto. In another embodiment, the ring portion and the magnets may not overlap each other in the optical-axis direction.

The first sensing coil 170A may have a closed curve shape surrounding the outer surface of the housing 140, for example, a ring shape, and the second sensing coil 170B may have a closed curve shape disposed around the bore 21 in the base 210, for example, a ring shape.

For example, each of the first sensing coil 170A and the second sensing coil 170B may have the shape of a ring that is wound in a clockwise or counterclockwise direction about the optical axis OA.

Referring to FIGS. 4B and 10A, one end 170a1 of the first sensing coil 170A, disposed at the side portion of the housing 140, may be wound around the first protrusion 47a of the housing 140 at least once, and may include a first extended line 17ƒ extending toward the distal end Q4 of the extension 81b of the first terminal 81.

A conductive adhesive 61a may be disposed both at the first extended line 17ƒ and at the distal end Q4 of the extension 81b of the first terminal 81. By means of the conductive adhesive 61a, the first extended line 17ƒ of the first sensing coil 170A and the first terminal 81 may be conductively connected to each other.

Another portion 170a2 of the first sensing coil 170A disposed at the housing 140 may be wound around the second protrusion 47b of the housing 140 at least once, and may include a second extended line 17g extending toward the distal end P4 of the extension 82b of the second terminal 82.

A conductive adhesive 61b may be disposed both at the second extended line 17g and at the distal end P4 of the extension 82b of the second terminal 82. By means of the conductive adhesive 61b, the second extended line 17g of the first sensing coil 170A and the second terminal 82 may be conductively connected to each other.

For example, the conductive adhesive 61a may be spaced apart from a second portion 17b of the first sensing coil 170A, and the conductive adhesive 61b may be spaced apart from a fourth portion 17d of the first sensing coil 170A. Consequently, the length of the first sensing coil 170A may be further increased. In another embodiment, the conductive adhesive may be in contact with the second portion 17b or the fourth portion 17d of the first sensing coil 170A.

For example, each of the conductive adhesives 61a and 61b may be conductive resin, for example, Ag epoxy or solder.

The first sensing coil 170A may include a conductive line (for example, a copper line) and a sheath enveloping the conductive line (for example, an insulation portion), and the conductive lines of the first extended line 17ƒ and the second extended line 17g of the first sensing coil 170A may be exposed from the sheath. The reason for this is to conductively connect the extensions 81b and 82b of the first and second terminals 81 and 82 to the first sensing coil 170A. Furthermore, the conductive lines of the third and fifth portions 17c and 17e of the first sensing coil 170A may be exposed from the sheath.

For example, the first sensing coil 170A may include a first portion 17a disposed in the seating groove 141b in the housing 140, a second portion 17b wound around the first protrusion 47a of the housing 140, a third portion 17c connecting one end of the first portion 17a to the second portion 17b, a fourth portion 17d wound around the second protrusion 47b of the housing 140, a fifth portion 17e connecting the other end of the first portion 17a to the fourth portion 17d, a sixth portion 17ƒ extending from one end of the second portion 17b, and a seventh portion 17g extending from one end of the fourth portion 17d.

For example, the sixth portion of the first sensing coil 170A may be the above-mentioned first extended line 17ƒ, and the seventh portion of the second coil 170-1 may be the above-mentioned second extended line 17g.

The first portion 17a, which is the body of the first sensing coil 170A, may generate first induction voltage resulting from mutual induction with the coil 120, and may include a plurality of strands.

The second to seventh portions 17b to 17g of the first sensing coil 170A may be portions extending from the first portion 17a, which is the body of the first sensing coil 170A, and may be composed of only one strand.

The reason why a portion of the first sensing coil 170A is wound around the first protrusion 147a and another portion of the first sensing coil 170A is wound around the second protrusion 147b is to make it possible to solder a portion of the first sensing coil 170A to the extension 81b of the first terminal 81 and to solder another portion of the first sensing coil 170a to the extension 82b of the second terminal 82, without additional orderly arrangement of the line. Another reason is to stably and securely fix the one portion and another portion of the first sensing coil 170A to the first and second protrusions 47a and 47b of the housing 140 to thus prevent displacement or shaking of the first sensing coil 170A during soldering, thereby improving solderability.

Referring to FIG. 10A, a first coupling portion may be positioned higher than a second coupling portion with respect to the lower surface of the base 210.

The first coupling portion may be the coupling portion between one end of the first sensing coil 170A and the first terminal 81 and the coupling portion between the other end of the first sensing coil 170A and the second terminal. For example, the first coupling portion may be the conductive adhesive 61a and 61b.

The second coupling portion may be the coupling portion between one end of the second sensing coil 170B and the third terminal 83 and the coupling portion between the other end of the second sensing coil 170B and the fourth terminal 84. For example, the second coupling portion may be the conductive adhesive 71 and 72.

Each of the fourth extending portion Q4 of the first terminal 81 and the fourth extending portion P4 of the second terminal 82 may be positioned higher than the upper surface of each of the first portions 8a1 and 9a1 of the third and fourth terminals 83 and 84 with respect to the lower surface of the base 210.

Referring to FIG. 14, at the initial position of the AF operation unit (for example, the bobbin 110), the first sensing coil 170A may be positioned so as to be spaced apart from the coil 120 by a first predetermined distance d1 in an upward direction, and the second coil 170B may be positioned so as to be spaced apart from the coil 120 by a second predetermined distance d2 in a downward direction. For example, each of the distances d1 and d2 may be a distance in the direction of the optical axis OA or in a direction parallel to the optical axis.

For example, when a lens or a lens module is not mounted in the bobbin 110, the first distance d1 may be less than or equal to the second distance d2 at the initial position of the AF operation unit (for example, the bobbin 110).

For example, a first number of turns N1 of the first sensing coil 170A may be the same as a second number of turns N2 of the second sensing coil 170B. Here, N1 may be the number of turns that the first sensing coil 170A is wound about the optical axis, and N2 may be the number of turns that the second sensing coil 170B is wound about the optical axis.

In another embodiment, the ratio of the first distance d1 to the second distance d2 (d1:d2) may be 1:1-1:1.5. Alternatively, the ratio of the second distance d2 to the first distance d1 (d2:d1) may be 1:1-1:1.5. In another embodiment, the ratio of the first number of turns N1 to the second number of turns N2 (N1:N2) may be 1:1-1:1.5. Alternatively, the ratio of the second number of turns N2 to the first number of turns N1 (N2:N1) may be 1:1-1:1.5.

Although at least a portion of the first sensing coil 170A may overlap at least one of the first to fourth magnets 130-1 to 130-4 in the optical-axis direction at the initial position of the AF operation unit, the disclosure is not limited thereto. In another embodiment, the two components may not overlap each other in the optical-axis direction. Furthermore, although at least a portion of the second sensing coil 170B may overlap at least one of the first to fourth magnets 130-1 to 130-4 in the optical-axis direction, the disclosure is not limited thereto. In another embodiment, the two components may not overlap each other in the optical-axis direction.

Referring to FIGS. 6 and 11, for example, the lens moving apparatus 100 may include the first solder 71 for coupling one end (or a starting line) 170b1 of the second sensing coil 170B to the first portion 83a of the third terminal 83. For example, the first solder 71 may be coupled to at least one of the first region S5 and the second region S6 of the third terminal 83.

Furthermore, the lens moving apparatus 100 may include the second solder 72 for coupling the other end (or the ending line) 170b2 of the second sensing coil 170B to the first portion 84a of the fourth terminal 84. For example, the second solder 72 may be coupled to at least one of the first region S7 and the second region S8 of the fourth terminal 84.

At least a portion of the second sensing coil 170B may be disposed at the first portion 8a1 of the first terminal 81, the first portion 9a1 of the second terminal 82, the first portion 83a of the third terminal 83, and the first portion 84a of the fourth terminal 84.

For example, at least a portion of the second sensing coil 170B may overlap the first portion 8a1 of the first terminal 81, the first portion 9a1 of the second terminal 82, the first portion 83a of the third terminal 83, and the first portion 84a of the fourth terminal 84 in the optical-axis direction.

For example, although at least a portion of the coil 120 may overlap the first portion 8a1 of the first terminal 81, the first portion 9a1 of the second terminal 82, the first portion 83a of the third terminal 83, and the first portion 84a of the fourth terminal 84 in the optical-axis direction, the disclosure is not limited thereto. In another embodiment, the coil 120 may not overlap at least one of the first to fourth terminals 81 to 84 in the optical-axis direction.

The second sensing coil 170B may be disposed under the bobbin 110.

Each of the first and second sensing coils 170A and 170B may have a shape corresponding to the coil 120.

For example, the coil 120 may include a ring portion having a circular shape, an elliptical shape or a polygonal shape (for example, a rectangular shape, a pentagonal shape, an octagonal shape or the like). Each of the first and second sensing coils 170A and 170B may include a ring portion having a circular shape, an elliptical shape or a polygonal shape (for example, a rectangular shape, a pentagonal shape, an octagonal shape, or the like).

Although the diameter R2 of the ring portion of the second sensing coil 170B may be greater than the diameter R1 of the ring portion of the coil 120, the disclosure is not limited thereto. In another embodiment, R2=R1 may be true.

Although the diameter R3 of the ring portion of the first sensing coil 170A may be greater than the diameter R2 of the ring portion of the second sensing coil 170B, the disclosure is not limited thereto. In another embodiment, R3=R2 may be true.

For example, the diameter R1 may be the maximum of the internal diameter defined by the inner surface of the coil 120, the diameter R2 may be the maximum diameter of the internal diameter defined by the inner surface of the second sensing coil 170B, and the diameter R3 may be the maximum of the internal diameter defined by the inner surface of the first sensing coil 170B.

For example, although the external diameter of the ring portion of the second sensing coil 170B may be greater than the external diameter of the bobbin 110, the disclosure is not limited thereto. Here, the external diameter of the ring portion of the second sensing coil 170B may be the outer diameter of the second sensing coil 170B.

When viewed from above, the first and second solders 71 and 72 may be positioned inside the second sensing coil 170B, and the second portions 8b1, 9b1, 83b and 84b of the first to fourth terminals 81 to 84 may be positioned outside the second sensing coil 170B.

For example, when viewed from above, the coil 120 may include first sides 4a and first corners 4b, the second sensing coil 170B may include second sides 5a and second corners 5b, and the first sensing coil 170A may include third sides 6a and third corners 6b.

For example, the first sides 4a of the coil 120 and the third sides 6a of the first sensing coil 170A may be portions that correspond to or face the side portions 141-1 to 141-4 of the housing 140 or the magnets 130-1 to 130-4 disposed at the housing 140. For example, the first corners 4b of the coil 120 and the third corners 6b of the first sensing coil 170A may be portions that correspond to or face the corner portions 142-1 to 142-4 of the housing 140.

For example, the second sides 5a of the second sensing coil 170B may be portions that correspond to or face the side portions of the base 210, the side portions of the housing 140, or the first sides 4a of the coil 120. For example, the second corners 5b of the second sensing coil 170B may be portions that correspond to or face the corner portions of the base 210, the corner portions of the housing 140, or the first corners 4b of the coil 120.

For example, when viewed from above, at least one of the second sides 5a of the second sensing coil 170B may be disposed outside the coil 120 or at the outside of the coil 120. Furthermore, when viewed from above, at least one of the second corners 5b of the second sensing coil 170B may be disposed inside the coil 120.

For example, when viewed from above, the coil 120 and the second sensing coil 170B may be positioned inside the first sensing coil 170A.

For example, a portion of the second sensing coil 170B that overlaps the third and fourth terminals 83 and 84 in the optical-axis direction may overlap a portion of the coil 120 in the optical-axis direction.

In order to increase AF driving force, the length H1 (see FIG. 14) of the coil 120 in the optical-axis direction may be greater than the length H2 (see FIG. 14) of the first sensing coil 170A in the optical-axis direction and the length H3 (see FIG. 14) of the second sensing coil 170B in the optical-axis direction. In another embodiment, the length of the coil 120 in the optical-axis direction may be equal to or less than at least one of the length of the first sensing coil 170A in the optical-axis direction and the length of the second sensing coil 170B in the optical-axis direction.

Each of the first sensing coil 170A and the second sensing coil 170B may be an induction coil for detecting the position or displacement of the AF operation unit, for example, the bobbin 110. Although each of the first sensing coil 170A and the second sensing coil 170B may be embodied as a wire, the disclosure is not limited thereto. In another embodiment, each of the first sensing coil 170A and the second sensing coil 170B may be embodied as an FPCB-type coil or an FP (fine pattern)-type coil.

For example, when the AF operation unit is moved by the interaction between the coil 120, to which a drive signal is applied, and the magnet 130, a first induction voltage may be generated by the interaction between the coil 120 and the first sensing coil 170A, and a second induction voltage may be generated by the interaction between the coil 120 and the second sensing coil 170B.

The magnitude of each of the first induction voltage and the second induction voltage may be determined based on displacement of the AF operation unit. The first induction voltage of the first sensing coil 170A may be output via the first terminal 81 and the second terminal 82, and the second induction voltage of the second sensing coil 170B may be output via the third terminal 83 and the fourth terminal 84.

A controller of a camera module 200 or a controller 780 of an optical device 200A may detect displacement of the AF operation unit using the first induction voltage supplied via the first and second terminals 81 and 82 of the lens moving apparatus 100 and the second induction voltage supplied via the third and fourth terminals 83 and 84.

For example, when the AF operation unit (for example, the bobbin 110) is positioned higher than the reference position, it is possible to detect displacement of the AF operation unit using the second induction voltage of the second sensing coil 170B. Meanwhile, when the AF operation unit (for example, the bobbin 110) is positioned lower than the reference position, it is possible to detect displacement of the AF operation unit using the second induction voltage of the first sensing coil 170B. Here, although the reference position may be the initial position of the AF operation unit (for example, the bobbin 110), the disclosure is not limited thereto. In another embodiment, the reference position may be a position that is spaced apart from the initial position of the AF operation unit by a predetermined distance in an upward direction or in a downward direction.

The linear relationship between the displacement of the bobbin 110 and the size of the first induction voltage may be referred to as a first linearity, and the linearity between the displacement of the bobbin 110 and the size of the second induction voltage may be referred to as a second linearity.

The second linearity may be superior to the first linearity when the AF operation unit (for example, the bobbin 110) is positioned higher than the reference position, and the first linearity may be superior to the second linearity when the AF operation unit (for example, the bobbin 110) is positioned lower than the reference position. Accordingly, by selectively using one of the first induction voltage and the second induction voltage depending on the displacement of the AF operation unit, the embodiment is able to improve the linearity between the displacement of the AF operation unit and the magnitude of the induction voltage. Consequently, it is possible to improve sensitivity in detection of displacement of the AF operation unit to thus more accurately detect the displacement of the AF operation unit.

As described above, the embodiment is able to detect the displacement of the AF operation unit using the first sensing coil 170A and the second sensing coil 170B, and serves to perform an AF feedback operation using the detected displacement of the AF operation unit to thus perform an accurate AF operation.

Generally, because there are necessities for a position sensor (for example, a Hall sensor) capable of detecting the displacement of the AF operation unit, for example, the bobbin, and an additional structure configured to allow power for driving the position sensor to be supplied to the position sensor in order to perform AF feedback control, the cost of the lens moving apparatus may increase and the manufacture of the lens moving apparatus may be made difficult.

The linear zone (hereinafter, referred to as a "first linear zone") in a graph plotted between the moving distance of the bobbin and the magnetic flux of the magnet detected by the position sensor may be restricted by the positional relationship between the magnet and the position sensor.

Since the embodiment does not require an additional position sensor for detecting displacement of the bobbin 110, it is possible to reduce the cost of the lens moving apparatus and to facilitate the manufacturing process.

Furthermore, since the first induction voltage resulting from the mutual induction between the coil 120 and the first sensing coil 170A and the second induction voltage resulting from the mutual induction between the coil 120 and the second sensing coil 170B are selectively used, the linear zone in a graph plotted between the displacement of the bobbin 110 and the induction voltages of the first and second sensing coils 170A and 170B may be increased more than the first linear zone. Consequently, the embodiment is able to ensure linearity over a wide range, reduce a defective fraction, and perform more accurate AF feedback control.

In order to provide the coil 120 with a drive signal via the lower elastic member and to receive the first and second induction voltages of the first and second sensing coils 170A and 170B, the lower elastic member must include at least six elastic members, which are separated from one another, and the six lower elastic members must include connecting terminals for conductive connection to external components. The connecting terminals may be disposed on two different outer surfaces of the base. Hence, it is impossible to perform soldering for conductive connection to external components only at one side, and a workload may be increased. Furthermore, because the lower elastic member is prepared in the state of being divided into six pieces, the incidence of defects caused by spring deformation is increased, thereby making it difficult to manufacture the lens moving apparatus.

The lens moving apparatus 100 according to the embodiment may include the two elastic members 160-1 and 160-2 for supplying a drive signal to the coil 120 and the first to fourth terminals 81 to 84 for receiving the first and second induction voltages of the first and second sensing coils 170A and 170B.

Furthermore, since the first to fourth terminals 81 to 84 and the connecting terminals 164-1 and 164-2 of the first and second elastic members 160-1 and 160-2 are disposed on one outer surface 208 of the base 210, it is possible to reduce the amount of soldering work and to improve convenience in soldering. In addition, since there is no need to divide the lower elastic member into six pieces, it is possible to reduce defects caused by spring deformation.

Referring to FIG. 12, the first to fourth terminals 81 to 84 and the first and second connecting terminals 164-1 and 164-2 of the first and second elastic members 160-1 and 160-2 may be positioned inside the reference line 207.

For example, each of the first to fourth terminals 81 to 84 may include the extending portion disposed on the outer surface of the base 210, and the extending portion of each of the first and second connecting terminals 164-1 and 164-2 and the first to fourth terminals 81 to 84 may be disposed inside the reference line 207.

For example, the second portions 8b1, 9b1, 83b and 84b of the first to fourth terminals 81 to 84 and the first and second connecting terminals 164-1 and 164-2 of the lower elastic member 160 may be positioned inside the reference line 207 or at the inside of the reference line 207.

Here, the reference line 207 may be an imaginary line extending between two corners BC1 and BC2 of the lower surface of the base 210 adjacent to the outer surface 208 of the base 210-1, at which the second portions 8b1, 9b1, 83b and 84b of the first to fourth terminals 81 to 84 and the first and second terminals 164-1 and 164-2 are disposed.

For example, the inside of the reference line 207 may be a side at which the bore 21 in the base 210 or the center of the base 210 is positioned with respect to the reference line 207.

The first to fourth terminals 81 to 84 and the first and second connecting terminals 164-1 and 164-2 may not escape or project outwards from the reference line 207. Here, the outside of the reference line may be a side opposite the inside of the reference line 207.

Although the second portions 8b1, 9b1, 83b and 84b of the first to fourth terminals 81 to 84 may be disposed further inwards than the first and second connecting terminals 164-1 and 164-2 with respect to the reference line 207, the disclosure is not limited thereto. In another embodiment, the first and second connecting terminals 164-1 and 164-2 may be positioned further inwards than the second portions 8b1, 9b1, 83b and 84b of the first to fourth terminals 81 to 84 with respect to the reference line 207. In a further embodiment, the first and second connecting terminals 164-1 and 164-2 and the second portions 8b1, 9b1, 83b and 84b of the first to fourth terminals 81 to 84 may be positioned so as to be inwardly spaced apart from the reference line 207 by the same distance.

Although the second portions 83b and 84b of the third and fourth terminals 83 and 84 are positioned between the first and second connecting terminals 164-1 and 164-2 in FIG. 9 or 12, the disclosure is not limited thereto. In another embodiment, the first and second connecting terminals 164-1 and 164-2 may be disposed between the second portions 83b and 84b of the third and fourth terminals 83 and 84.

Although the second portions 8b1, 9b1, 83b and 84b of the first to fourth terminals 81 to 84 and the first and second connecting terminals 164-1 and 164-2 do not project downwards from the lower surface of the base 210 in FIG. 12, the disclosure is not limited thereto.

In another embodiment, for example, portions of the second portions of the first to fourth terminals 81 to 84 may be exposed or may project downwards from the lower surface of the base 210. In another embodiment, for example, portions of the first and second connecting terminals may be exposed or may project downwards from the lower surface of the base 210. In this case, the portions of the second portions of the first to fourth terminals and the portions of the first and second connecting terminals that project downwards from the lower surface of the base 210 may be coupled to the terminals of the circuit board 800 of the camera module 200 by soldering.

For example, although the first and second connecting terminals 164-1 and 164-2 and the second portions 8b1, 9b1, 83b and 84b of the first to fourth terminals 81 to 84 may be disposed on the same plane parallel to the reference line 207, the disclosure is not limited thereto.

In another embodiment, the first and second connecting terminals 164-1 and 164-2 may be positioned closer to the reference line 207 than are the second portions 8b1, 9b1, 83b and 84b of the first to fourth terminals 81 to 84.

In a further embodiment, the second portions 8b1, 9b1, 83b and 84b of the first to fourth terminals 81 to 84 may be positioned closer to the reference line 207 than are the first and second connecting terminals 164-1 and 164-2.

Although, in the above-described embodiments, the two ends of the coil 120 are conductively connected to the first and second connecting terminals 164-1 and 164-2 of the first and second elastic members 160-1 and 160-2, the two ends of the first sensing coil 170A are conductively connected to the first and second terminals 81 and 82, and the two ends of the second sensing coil 170B are conductively connected to the third and fourth terminals 83 and 84, the disclosure is not limited thereto.

In another embodiment, the coil 120 may be conductively connected to the third and fourth terminals 83 and 84, and the second sensing coil 170B may be conductively connected to the first and second connecting terminals 164-1 and 164-2.

In a further embodiment, the two ends of the coil 120 may be conductively connected to two selected from among the first and second connecting terminals 164-1 and 164-2 and the first to fourth terminals, the first sensing coil 170A may be conductively connected to two others selected from among the first and second connecting terminals 164-1 and 164-2 and the first to fourth terminals, and the second sensing coil 170B may be conductively connected to the two remaining ones of the first and second connecting terminals 164-1 and 164-2 and the first to fourth terminals.

The lens moving apparatus according to the embodiment may be applied to various fields, for example, those of camera modules or optical devices.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 15:
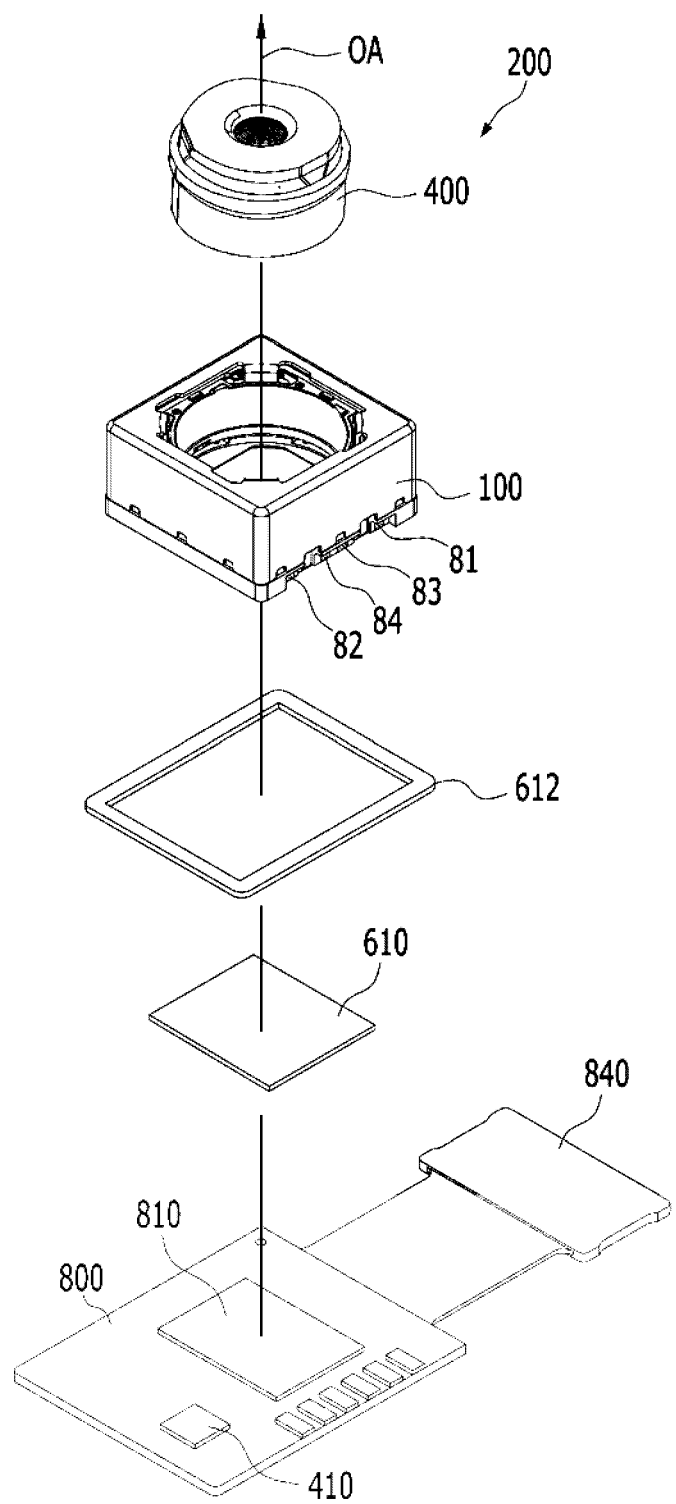
FIG. 15 is an exploded perspective view illustrating a camera module according to an embodiment.

FIG. 15 is an exploded perspective view illustrating a camera module 200 according to an embodiment.

Referring to FIG. 15, the camera module may include a lens or a lens module 400, the lens moving apparatus 100, an adhesive member 612, a filter 610, a circuit board 800, an image sensor 810, and a connector 840.

The lens module 400 may include a lens or a lens barrel, and may be mounted or coupled to the bobbin 110 of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100 through threaded engagement. For example, the lens module 400 may be coupled to the lens moving apparatus 100 by means of an adhesive (not shown). The light that has passed through the lens module 400 may be radiated to the image sensor 810 through the filter 610.

The adhesive member 612 may couple or attach the base 210 of the lens moving apparatus 100 to the circuit board 800. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 of the lens moving apparatus 100.

For example, the base 210 of the lens moving apparatus 100 may be provided on the lower surface thereof with a mounting portion on which the filter 610 is mounted. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in the light introduced through the lens moving apparatus 100, and may convert the received image into an electrical signal.

The image sensor 810 may be positioned such that the optical axis thereof is aligned with the optical axis of the lens module 400. Accordingly, the image sensor may obtain the light that has passed through the lens module 400. The image sensor 810 may output the radiated light as an image.

The circuit board 800 may be conductively connected to the coil 120 and the first and second sensing coils 170A and 170B of the lens moving apparatus 100.

For example, the circuit board 800 may include terminals, which are conductively connected to the first and second terminals 164-1 and 164-2 and the first to fourth terminals 81 to 84. Although the circuit board 800 is illustrated as including six terminals, the disclosure is not limited thereto. In another embodiment, the circuit board 800 may include a plurality of terminals, for example, two or more terminals for AF driving.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device.

The camera module 200 may include a controller 410 for controlling AF driving of the lens moving apparatus 100. In another embodiment, the controller 410 may be omitted.

Furthermore, the camera module 200 may further include a motion sensor for outputting rotational angular velocity information corresponding to motion of the camera module 200.

Figure 16:
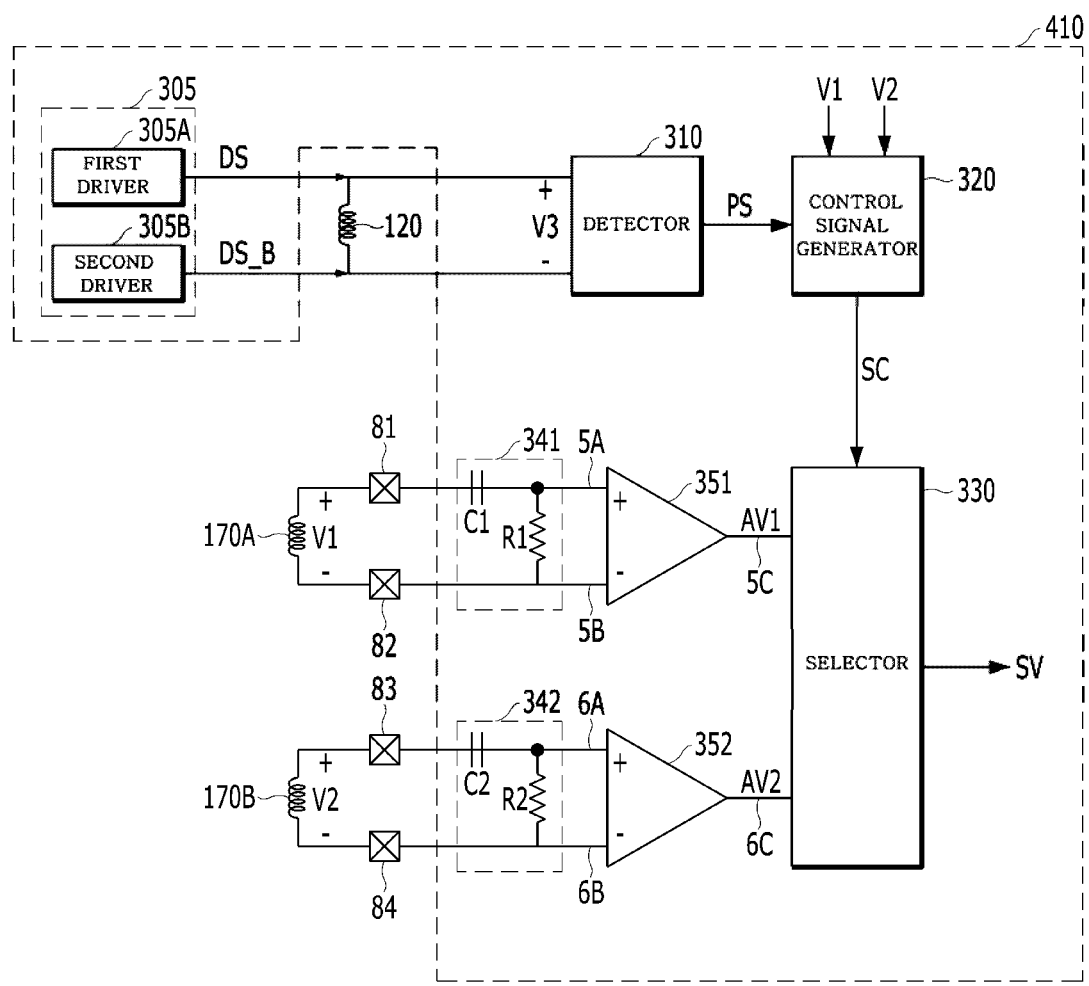
FIG. 16 is a block diagram illustrating an embodiment of a controller of the camera module.

FIG. 16 is a block diagram illustrating an embodiment of the controller 410 of the camera module 200.

Referring to FIG. 16, the controller 410 may include a driver 305, a detector 310, a control-signal generator 320 and a selector 330.

The driver 305 may generate or provide a drive signal for driving the coil 120.

The driver 305 may provide a drive signal for bidirectional driving. For example, the driver 305 may provide the coil 120 with a differential signal in order to eliminate noise originating externally.

For example, the driver 305 may include a first driver 305A, configured to provide the coil 120 with a first signal DS, and a second driver 305B, configured to provide the coil 120 with a second signal BS_S. The second signal DS_B may be a signal obtained by inverting the first signal.

For example, the first signal DS and the second signal DS_B may have the same frequency and amplitude but may have opposite phases.

The detector 210 may detect the voltage of the coil 120 to which a drive signal is supplied may determine, based on the detected voltage of the coil 120, at which among a first zone and a second zone the AF operation unit (for example, the bobbin 110) is positioned with respect to the initial position of the AF operation unit (for example, the bobbin 110), and may output a detection signal PS corresponding to the result of the determination.

The first zone may be a zone in which the AF operation unit (for example, the bobbin 110) is positioned above (or ahead of) the initial position of the AF operation unit, and the second zone may be a zone in which the AF operation unit (for example, the bobbin 110) is positioned under (or behind) the initial position of the AF operation unit.

In other words, for example, the first zone may be a zone ranging from the initial position of the AF operation unit to the macro position of the AF operation unit, and the second zone may be a zone ranging from the initial position of the AF operation unit to the infinite position. Here, the infinite position may be a position or stroke of the AF operation unit corresponding to an infinite focus, and the macro position may be a position or stroke of the AF operation unit corresponding to a closeup focus in a macro mode.

In other words, for example, the first zone may be a zone in which the AF operation unit is physically moved in an upward or forward direction from the initial position of the AF operation unit, and the second zone may be a zone in which the AF operation unit is physically moved in a downward or rearward direction from the initial position of the AF operation unit.

In other words, for example, the first zone may be a zone in which the AF operation unit is positioned such that the coil 120 is positioned in the range between the initial position of the coil 120 and the first position 309 of the coil 120, and the second zone may be a zone in which the AF operation unit is positioned such that the coil 120 is positioned in the range between the initial position of the coil 120 and the second position 307 of the coil 120.

In other words, for example, the first zone may be a zone in which a first induction voltage V1 is higher than a first reference voltage (for example, V11) and/or a second induction voltage V2 is lower than a second reference voltage (for example, V21). For example, the first zone may be a zone that satisfies V11<V1<V12 and/or V22<V2<V21.

For example, the second zone may be a zone in which the first induction voltage V1 is lower than the first reference voltage (for example, V11) and/or the second induction voltage B2 is higher than the second reference voltage (for example, V21). For example, the second zone may be a zone that satisfies V13<V1<V11 and/or V21<V2<V23.

Figure 17A:
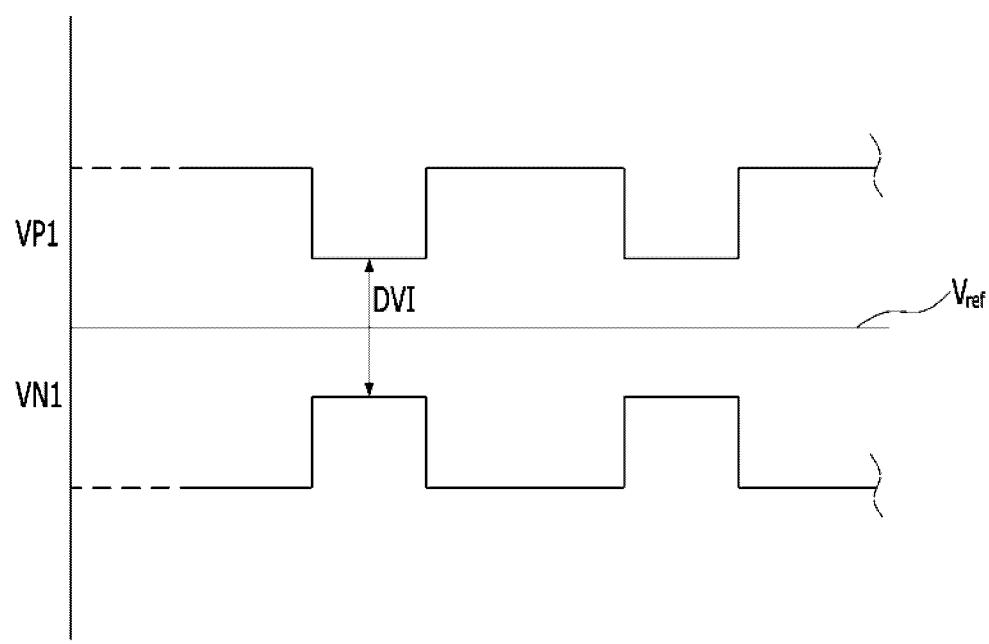
FIG. 17A illustrates an embodiment of a voltage of the coil detected by a detector.

FIG. 17A illustrates an embodiment of a voltage V3 of the coil 120 detected by the detector 310, and FIG. 17B illustrates an embodiment of a lookup table for the position of the bobbin 110 and the detection signal PS according to a voltage difference DV1.

When a differential signal is supplied to the coil 120 by the driver 305, the voltage V3 of the coil 120, which is detected by the detector 310, may have a differential signal waveform shown in FIG. 17A.

For example, the voltage of the coil 120 may include a positive signal VP1, which is higher than the reference voltage Vref, which is a DC voltage, and a negative signal VN1, which is lower than the reference voltage Vref.

The detector 310 may detect the voltage difference DV1 between the positive signal VP1 and the negative signal VN1, and may output the detection signal PS corresponding to the detected voltage difference DV1.

As illustrated in FIG. 17B, the controller 410 or 780 may include storage, for example, a lookup table, which stores therein information about the position of the bobbin 110 according to the voltage difference DV1.

The detector 310 may detect the voltage difference DV1, may determine at which among the first zone and the second zone the displacement of the AF operation is positioned using the lookup table shown in FIG. 17B, and may output the detection signal PS.

When the voltage difference DV1 falls within, for example, a first voltage range (V0-VH_N), the detector 310 may determine that the AF operation unit is positioned in the first zone, and the detection signal PS may have a first level (for example, a high level). However, the disclosure is not limited thereto, and the detection signal PS may have a second level (for example, a low level) in another embodiment. For example, the first voltage range may include first to Nth high voltages (VH_1 to VH_N), N being a natural number greater than 1 (N>1).

Meanwhile, when the voltage difference DV1 falls within a second voltage range (V0-HL_M), the detector 310 may determine that the AF operation unit is positioned in the second zone, and the detection signal PS may have the second level (for example, a low level). Although the detection signal PS may have the second level (for example, the low level), the disclosure is not limited thereto. In another embodiment, the detection signal PS may have the first level (for example, a high level).

For example, the second voltage range may include first to Mth low voltage (VL_1 to VL_M), M being a natural number greater than 1 (M>1).

In order to move the bobbin 110 in the optical-axis direction, the drive signal may be changed in size and/or polarity (+) or (−), and thus the voltage difference DV1 may vary according to the position of the bobbin 110.

In other words, the detector 310 may obtain the position or the position information of the bobbin 110 corresponding to the detected voltage difference DV1, and may output the detection signal PS using the obtained position or position information of the bobbin 110. The detection signal PS may indicate information about whether the bobbin 110 is positioned in the first zone or the second zone.

The control-signal generator 320 may create a control signal SC based on the first induction voltage V1, the second induction voltage V2 and the detection signal PS, which are supplied from the lens moving apparatus 100.

The selector 330 may receive the first induction voltage V1 and the second induction voltage V2 from the lens moving apparatus 100, and may select and output one of the received first induction voltage V1 and the second induction voltage V2 based on the control signal SC.

The controller 410 may include a first high-pass filter 341 and a second high-pass filter 342.

The first high-pass filter 341 blocks low-frequency components of the first induction voltage V1 and passes therethrough high-frequency components of the first induction voltage V1. For example, the first high-pass filter 341 may include a first capacitor C1 and a first resistor R1. The first high-pass filter 341 may be alternatively referred to as or embodied as a first low-pass filter.

The second high-pass filter 342 blocks low-frequency components of the second induction voltage V2 and passes therethrough high-frequency components of the second induction voltage B2. For example, the second high-pass filter 342 may include a second capacitor C2 and a second resistor R2. The second high-pass filter 342 may be alternatively referred to as or embodied as a second low-pass filter.

For example, although the capacitance of the first capacitor C1 and the capacitance of the second capacitor C2 may be the same, the disclosure is not limited thereto. In another embodiment, the two capacitances may be different from each other. Furthermore, for example, although the resistance value of the first resistor R1 and the resistance value of the second resistor R2 may be the same, the disclosure is not limited thereto. In another embodiment, the two resistance values may be different from each other.

In another embodiment, the first and second high-pass filters 341 and 342 may be omitted.

The controller 410 may include a first amplifier 351 and a second amplifier 352.

The first amplifier 351 may amplify the first induction voltage V1 and may output the amplified first induction voltage AV1, and the second amplifier 352 may amplify the second induction voltage V2 and may output the amplified second induction voltage AV2.

For example, although each of the first and second amplifiers 351 and 352 may be a differential amplifier or an operational amplifier, the disclosure is not limited thereto.

For example, the first amplifier 351 may include a first input terminal 5A, a second input terminal 5B, and a first output terminal 5C, and the second amplifier 352 may include a third input terminal 6A, a fourth input terminal 6B, and a second output terminal 6C.

The connection node connecting the first capacitor C1 and one end of the first resistor R1 may be connected to the first input terminal 5A of the first amplifier 351, and the other end of the first resistor R1 may be connected to the second input terminal 5B of the first amplifier 351.

The connection node connecting the second capacitor C2 and one end of the second resistor R2 may be connected to the third input terminal 6A of the second amplifier 352, and the other end of the second resistor R2 may be connected to the second input terminal 6B.

The selector 330 may select one of the first output AV1 from the output terminal 5C of the first amplifier 351 and the second output AV2 from the output terminal 6C of the second amplifier 351 based on the control signal SC, and may output the selection result as a sensing signal SV for detecting the displacement of the bobbin 110.

Figure 18:
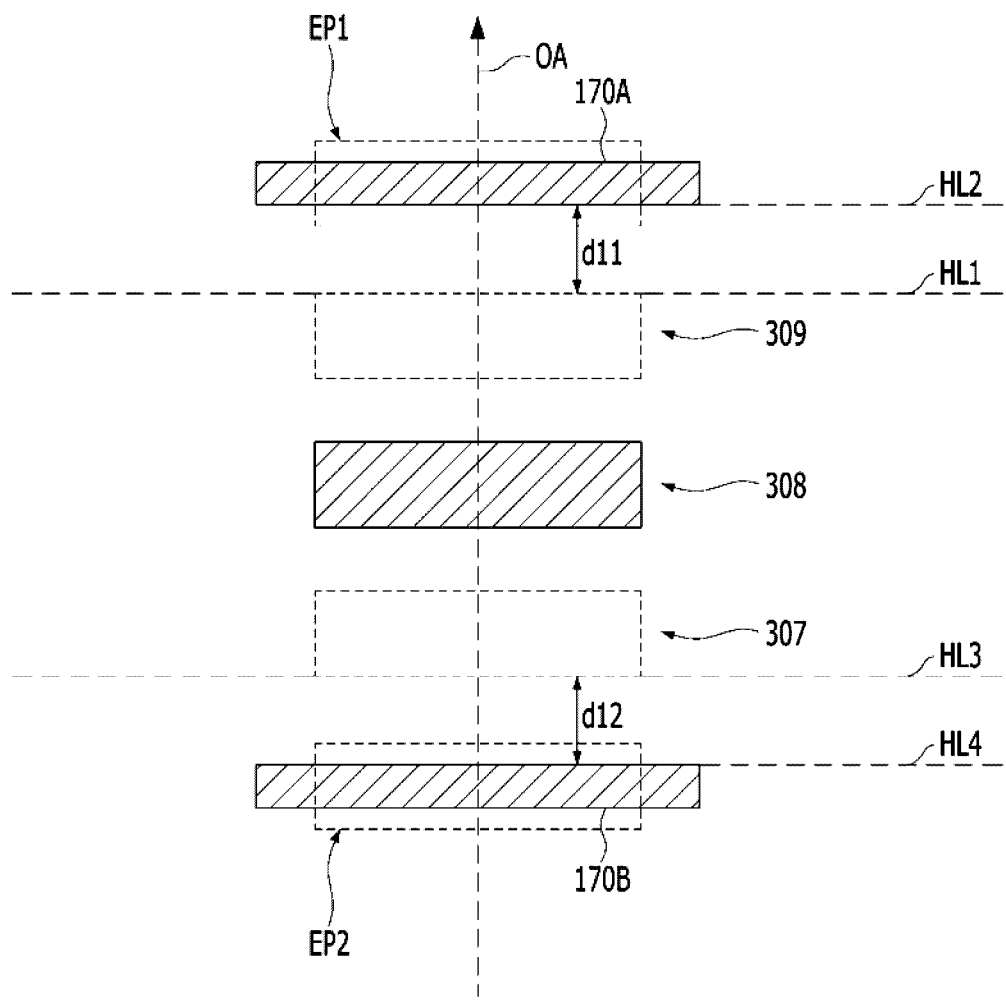
FIG. 18 illustrates the positional relationships between the coil, the first sensing coil and the second sensing coil.
Figure 19:
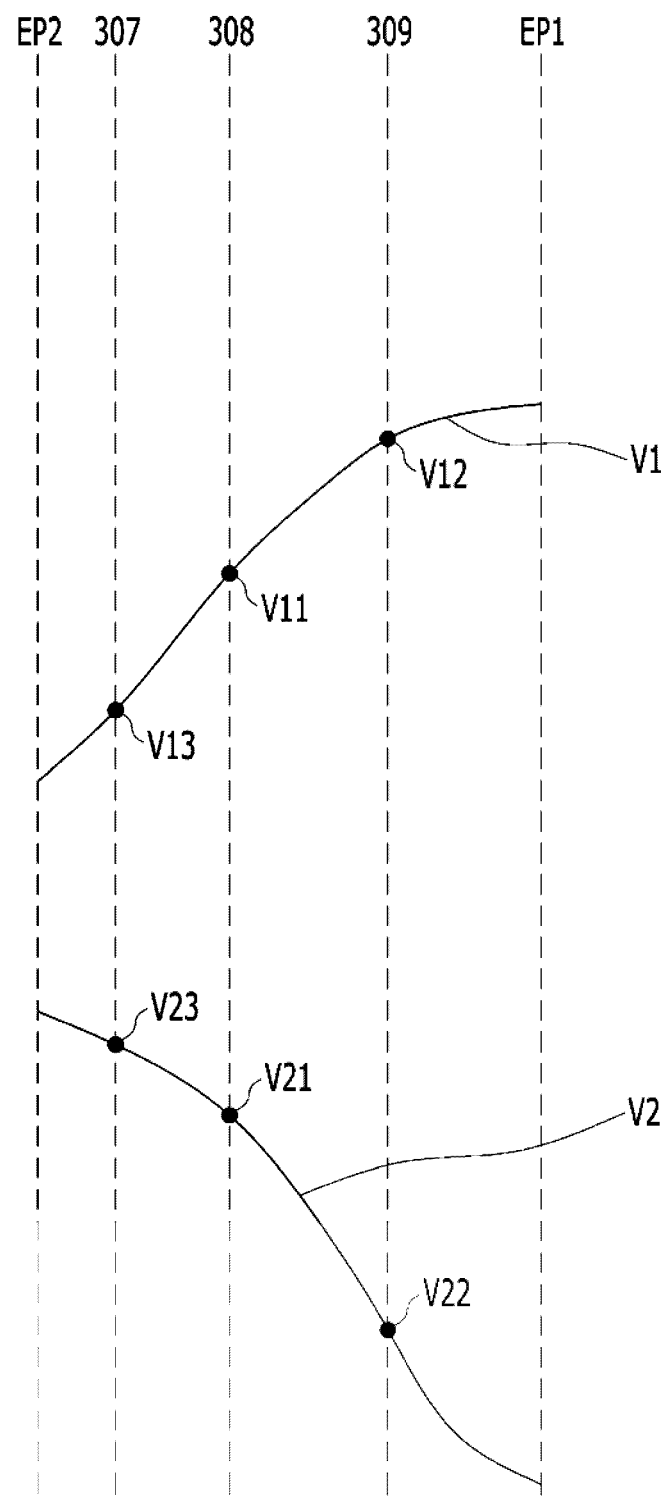
FIG. 19 illustrates a first induction voltage of the first sensing coil and a second induction voltage of the second sensing coil according to movement of the bobbin.
Figure 20:
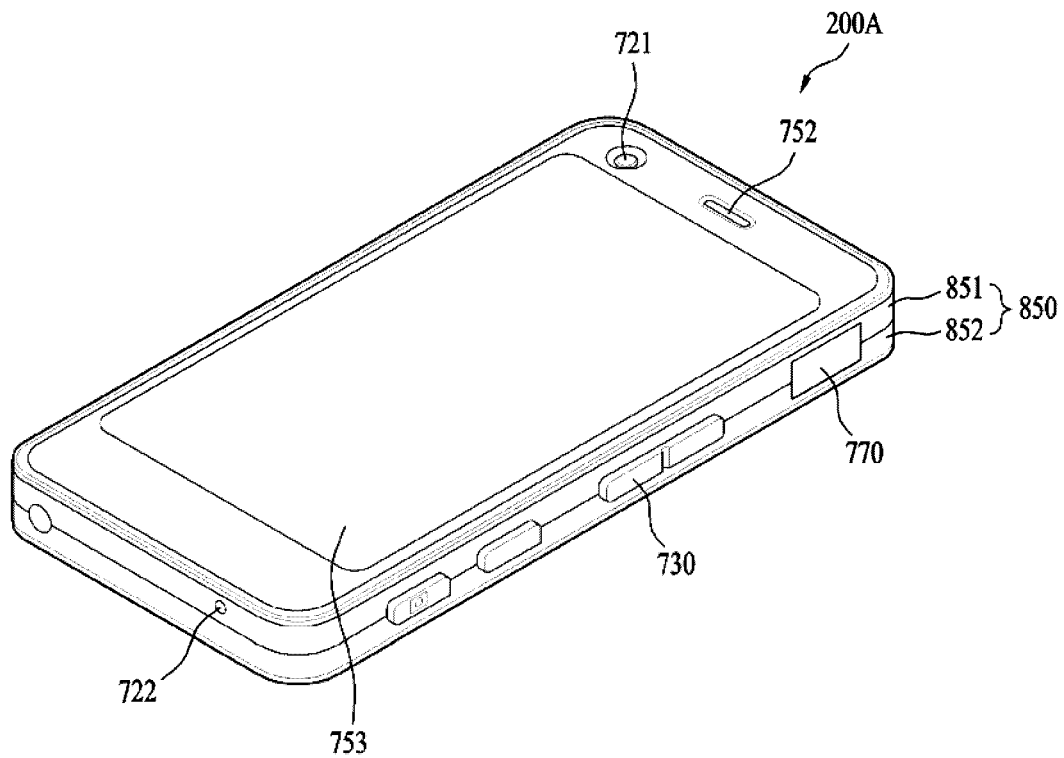
FIG. 20 is a perspective view of a portable terminal according to an embodiment.

FIG. 18 illustrates the positional relationships between the coil 120, the first sensing coil 170A and the second sensing coil 170B at the initial position of the bobbin 110. FIG. 19 illustrates the first induction voltage V1 of the first sensing coil 170A and the second induction voltage V2 of the second sensing coil 170B according to movement of the bobbin 110.

In FIG. 18, reference number 308 denotes the position of the coil 120 (hereinafter, referred to as the "initial position of the coil 120") at the initial position of the bobbin 110.

When the bobbin 110 is moved, the first induction voltage (or the second induction voltage) increases as the distance between the coil 120 and the first sensing coil 170A (or the second sensing coil 170B) decreases, and the first induction voltage (or the second induction voltage) decreases as the distance between the coil 120 and the first sensing coil 170A (or the second sensing coil 170B) increases.

For example, when the bobbin 110 is moved upwards (or forwards), the first induction voltage V1 may increase, whereas the second induction voltage V2 may decrease. Meanwhile, when the bobbin 110 is moved downwards (or rearwards), the first induction voltage V1 may decrease, whereas the second induction voltage V2 may increase.

Referring to FIGS. 17 and 18, assuming that the coil 120 overlaps the first sensing coil 170A in a direction perpendicular to the optical axis OA, EP1 may be the position of the coil 120. Assuming that the coil 120 overlaps the second sensing coil 170B in a direction perpendicular to the optical axis OA, EP2 may be the position of the coil 120.

In order to improve the linearity of the first induction voltage V1 and the second induction voltage V2 according to the displacement of the bobbin 110 and the position of the coil 120, the coil 120 may be positioned between the first position 309 and the second position 307.

The first position 309 may be a position of the coil 120 in the first zone of the bobbin 110, and the distance between the coil 120 and the first sensing coil 170A at the first position 309 may be a first separation distance d11.

The second position 307 may be another position of the coil 120 in the second zone of the bobbin 110, and the separation distance between the coil 120 and the second sensing coil 170B at the second position 309 may be a second separation distance.

For example, each of the first separation distance d11 and the second separation distance d12 may be 300 µm or more. For example, each of d11 and d12 may be 300 µm-1000 µm. For example, each of d11 and d12 may be 300 µm-500 µm.

For example, the first separation distance d11 may be the distance between a first imaginary horizontal line (or a first horizontal plane) HL1 positioned on the same flat surface as the first surface (for example, the upper surface) of the coil 120 and a second imaginary horizontal line (or a second horizontal plane) HL2 positioned on the same flat surface as the first surface (for example, the lower surface) of the first sensing coil 170A at the first position 309.

The second separation distance d12 may be the distance between a third imaginary horizontal line (or the third horizontal plane) HL3 positioned on the same flat surface as the second surface (for example, the lower surface) of the coil 120 and a fourth imaginary horizontal line (or a fourth horizontal plane) HL4 positioned on the same flat surface as the first surface (for example, the upper surface) of the second sensing coil 170B at the second position 307.

In the first zone, the linearity of the second induction voltage V2 according to the displacement of the bobbin 110 is superior to the linearity of the first induction voltage V1 according to the displacement of the bobbin 110. Meanwhile, in the second zone, the linearity of the first induction voltage B1 according to the displacement of the bobbin 110 is superior to the linearity of the second induction voltage V2 according to the displacement of the bobbin 110.

Accordingly, it is possible to improve the linearity between the induction voltage and the displacement of the bobbin 110 by selecting the second induction voltage V2 as a sensing voltage for detecting the displacement of the bobbin 110 in the first zone and by selecting the first induction voltage B1 as a sensing voltage for detecting the displacement of the bobbin 110 in the second zone. Consequently, it is possible to easily perform calibration for creating a coordinate value of the induction voltage of the sensing coil 170A or 170B according to the displacement of the bobbin 110, to improve the sensitivity for detecting the displacement of the AF operation unit, and to more accurately detect the displacement of the AF operation unit.

The control-signal generator 320 may determine at which among the first zone and the second zone the AF operation unit is positioned, using at least one of the detection signal PS, the first voltage V1 and the second voltage V2.

For example, the control-signal generator 320 may determine at which among the first zone and the second zone the AF operation unit is positioned, based on the detection signal PS, and may create the control signal SC depending on the result of the determination.

For example, the control signal SC may be created depending on the level of the detection signal PS.

A control-signal generator 320 according to another embodiment may determine at which among the first zone and the second zone the AF operation unit is positioned using the first induction voltage V1 and the second induction voltage V2, and may create the control signal SC depending on the result of the determination.

Referring to FIG. 19, for example, when the first induction voltage V1 is higher than the first voltage value V11 but is lower than or equal to the second voltage value V12 (V11<V1≤V12) and the second induction voltage V2 is lower than the third voltage value V21 but is higher than or equal to the fourth voltage value V22 (V22≤V2<V21), the control-signal generator 320 may determine that the bobbin 110 is positioned in the first zone, and may create the control signal SC depending on the result of the determination. For example, although the control signal SC, which is created in the control-signal generator 320, may have the first level (for example, the high level), the disclosure is not limited thereto. In another embodiment, the control signal SC may have the second level.

Meanwhile, when the first induction voltage V1 is lower than the first voltage value V11 but is higher than or equal to the fifth voltage value V13 (V13≤V1<V11) and the second induction voltage V2 is higher than the third voltage value V21 but is lower than or equal to the sixth voltage value V23 (V21<V2≤V23), the control-signal generator 320 may determine that the bobbin 110 is positioned in the second zone, and may create the control signal SC depending on the result of the determination. For example, although the control signal SC, which is created in the control-signal generator 320, may have the second level (for example, the lower level), the disclosure is not limited thereto. In another embodiment, the control signal SC may have the first level.

For example, when the difference between the first voltage V1 and the second voltage (V1-V2) or the sum of the first voltage V1 and the second voltage (V1+V2) is within a predetermined first range, the control-signal generator 320 may determine that the bobbin 110 is positioned in the first zone, and may create the control signal SC having the first level (for example, the high level) depending on the result of the determination.

Meanwhile, when the difference between the first voltage V1 and the second voltage (V1-V2) or the sum of the first voltage V1 and the second voltage (V1+V2) is within a predetermined second range, the control-signal generator 320 may determine that the bobbin 110 is positioned in the second zone, and may create the control signal SC having the second level (for example, the low level) depending on the result of the determination. Here, the first range and the second range may not overlap each other or may not include the same value.

A control-signal generator 320 according to a further embodiment may create the control signal SC using all of the detection signal PS, the first induction voltage V1 and the second induction voltage V2. In this case, it is possible to improve the reliability of the determination of the position of the bobbin 110.

For example, it is possible to create the control signal SC depending on the result of logical operation of the detection signal PS, the first induction voltage V1 and the second induction voltage V2.

For example, when the result of the determination of the position of the bobbin depending on the detection signal PS coincides with the result of the determination of the position of the bobbin depending on the first induction voltage V1 and the second induction voltage V2, it is possible to improve the reliability of the determination of the position of the bobbin 110.

Meanwhile, for example, when the result of the determination of the position of the bobbin depending on the detection signal PS does not coincide with the result of the determination of the position of the bobbin depending on the first induction voltage V1 and the second induction voltage V2, it is possible to create the control signal SC depending on the result of the determination of the position of the bobbin 110 using the detection signal PS.

The selector 330 may receive the first induction voltage V1 of the first sensing coil 170A and the second induction voltage V2 of the second sensing coil 170B, may select one of the received first induction voltage V1 and the received second induction voltage V2 based on the control signal SC, and may output the one as the sensing voltage SV according to the displacement of the bobbin 110 in the direction of the optical axis OA.

The controller 410 may include a storage, for example, a memory for storing coordinate code values of displacements of the AF operation unit corresponding to the sensing voltage SV (for example, displacements of the bobbin in the optical-axis direction).

The coordinate code values of displacements of the AF operation unit may be created through calibration, and the displacements of the AF operation unit may be defined or determined by the coordinate code values created through the calibration, which is referred to as calibration for displacement of the AF operation unit in the optical-axis direction. In other words, coordinate code values corresponding to sensing voltages may be created through calibration, performed using simulation and experimentation, and the created coordinate code values may be stored in the controller 410.

The AF feedback operation may be performed based on the coordinate code values created through the calibration. Specifically, when the AF operation unit is moved in the optical-axis direction, the selector 330 may output the sensing voltage SV, and the controller 410 may select a coordinate code value corresponding to the sensing voltage SV output from the selector 330 and may control the displacement of the AF operation unit based on the selected coordinate code value.

For example, the controller 410 may move the AF operation unit to the target position based on the selected coordinate code value corresponding to the sensing voltage SV. For example, the controller 410 may control the drive signal supplied to the coil 120 in order to move the AF operation unit to the target position based on the selected coordinated code value corresponding to the sensing voltage SV.

The above-described storage for storing the coordinate code values and the above-described AF feedback operation based on the coordinate code value of the controller 410 may also be embodied by the controller 780 of the portable terminal 200A to be described later.

In another embodiment, the first induction voltage V1 may be selected as the sensing voltage for detecting the displacement of the bobbin 110 in the first zone, and the second induction voltage B2 may be selected as the sensing voltage for detecting the displacement of the bobbin 110 in the second zone. The reason for this is because the first induction voltage is higher than the second induction voltage because the AF coil is positioned close to the first sensing coil in the first zone and the second induction voltage is higher than the first induction voltage because the AF coil is positioned close to the second sensing coil in the second zone. In other words, the reason for this is to use a higher induction voltage.

Figure 21:
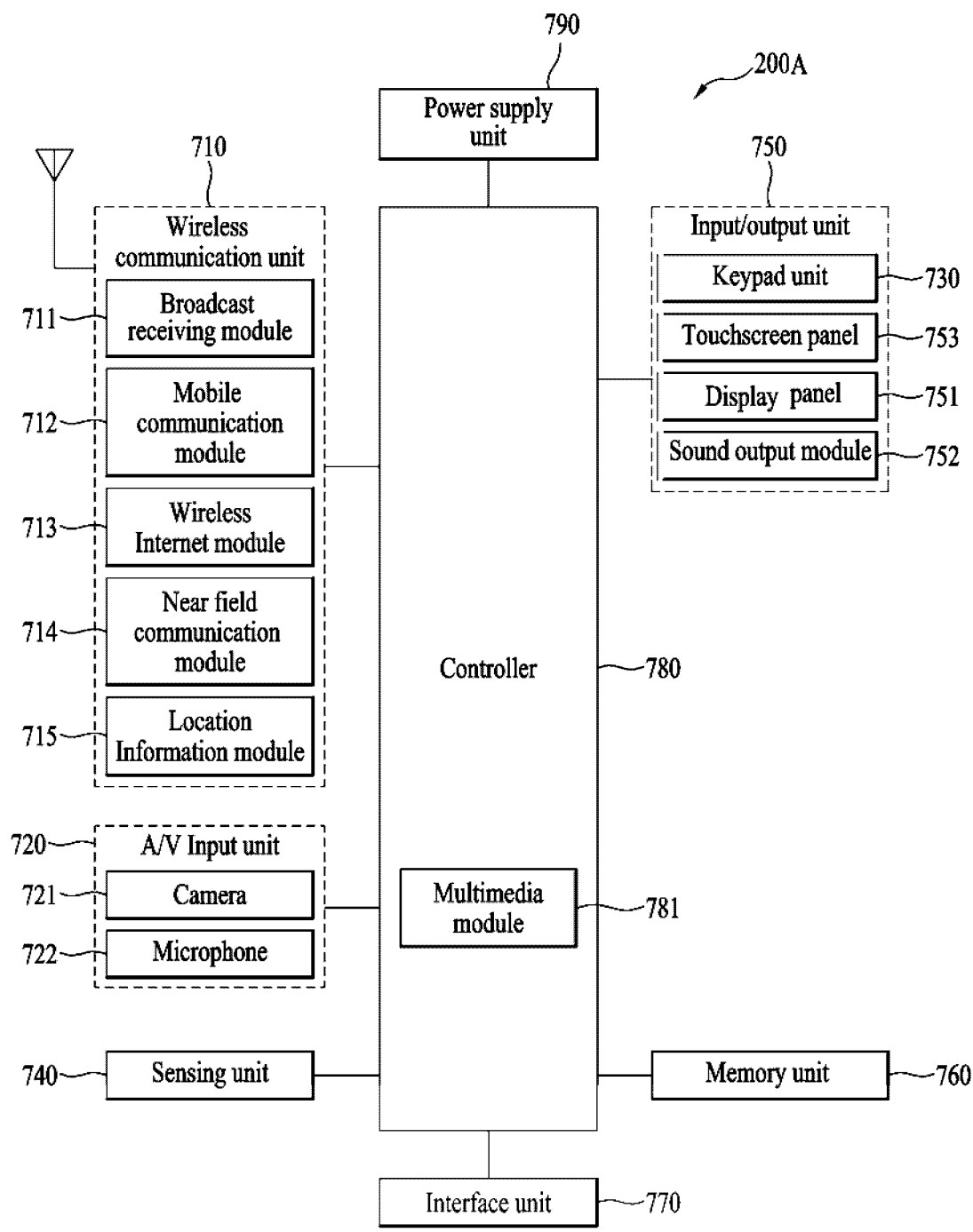
FIG. 21 is a view illustrating the configuration of the portable terminal illustrated in FIG. 20.

FIG. 21 is a perspective view illustrating a portable terminal 200A according to an embodiment. FIG. 22 is a view illustrating the configuration of the portable terminal 200A illustrated in FIG. 21.

Referring to FIGS. 21 and 22, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 21 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus, a camera and an optical device, which are capable of improving sensitivity and accuracy in sensing of the induction coil for detecting displacement of the bobbin.

The invention claimed is:
1. A lens moving apparatus comprising:
a housing;
a bobbin disposed in the housing;
a coil coupled to the bobbin;
a magnet disposed on the housing so as to face the coil;
a base disposed so as to be spaced apart from the bobbin and comprising a first side portion, a second side portion opposite to the first side portion, a third side portion between the first side portion and the second side portion, a fourth side portion opposite to the third side portion, a first projection located at a first corner portion between the first and third side portions thereof, and a second projection located at a second corner portion between the first and fourth side portions thereof;

a lower elastic member coupled to the bobbin and comprises a first elastic member and a second elastic member, disposed on the base;
a first sensing coil disposed on the housing and generates a first induction voltage through interaction with the coil;
a second sensing coil disposed on the base and generates a second induction voltage through interaction with the coil;
first to fourth terminals coupled to the base and are spaced apart from the first and second elastic members;
a first connecting terminal connecting the first elastic member; and
a second connecting terminal connecting the second elastic member,
wherein on end of the coil is coupled to the first elastic member and a remaining end of the coil is coupled to the second elastic member,
wherein the first terminal includes:
   a first body located on the first side portion of the base; and
   a first extension extending from the first body, the first extension having a portion located in the first corner portion of the base,
wherein the second terminal includes:
   a second body located on the first side portion of the base; and
   a second extension extending from the second body, the second extension having a portion located in the second corner portion of the base,
wherein a distal end of the portion of the first extension is exposed from an upper surface of the first projection of the base, and a distal end of the portion of the second extension is exposed from an upper surface of the second projection of the base, and
wherein one end of the first sensing coil is coupled to the distal end of the portion of the first extension and a remaining end of the first sensing coil is coupled to the distal end of the portion of the second extension.

2. The lens moving apparatus according to claim 1, wherein the first induction voltage of the first sensing coil is output through the first and second terminals, and the second induction voltage of the second sensing coil is output through the third and fourth terminals.

3. The lens moving apparatus according to claim 1, wherein the coil has a ring shape surrounding an outer surface of the bobbin, and the first sensing coil has a ring shape surrounding an outer surface of the housing, and wherein the base has a bore, and the second sensing coil have a ring shape surrounding the bore in the base.

4. The lens moving apparatus according to claim 1, wherein the first and second terminals are disposed on two sides of the first side portion of the base.

5. The lens moving apparatus according to claim 1, wherein each of the first and second bodies comprises a first portion, which is exposed from an upper surface of the base, and a second portion, which is bent and extends toward an outer side surface of the first side portion of the base.

6. The lens moving apparatus according to claim 5, wherein the first extension extends toward the first corner portion of the base from one side of the first portion of the first body, and the second extension extends toward the second corner portion of the base from one side of the first portion of the second body.

7. The lens moving apparatus according to claim 1, wherein the first connecting terminal is integrally formed with the first elastic member and the second connecting terminal is integrally formed with the second elastic member, and
   wherein the first connecting terminal is bent and extends toward an outer side surface of the first side portion of the base, and the second connecting terminal is bent and extends toward the first outer side surface of the base.

8. The lens moving apparatus according to claim 1, wherein the first elastic member is coupled to the first connecting terminal via a first conductive adhesive, and the second elastic member is coupled to the second connecting terminal via a second conductive adhesive.

9. The lens moving apparatus according to claim 7, wherein each of the first and second elastic members comprises an inner portion coupled to a lower portion of the bobbin, an outer portion coupled to a lower portion of the housing, and a connector connecting the inner portion to the outer portion, and
   wherein the first connecting terminal is bent at the outer portion of the first elastic member, and the second connecting terminal is bent at the outer portion of the second elastic member.

10. The lens moving apparatus according to claim 7, wherein the coil is provided with a drive signal via the first connecting terminal of the first elastic member and the second connecting terminal of the second elastic member, and the drive signal is an AC signal or comprises both AC and DC components.

11. The lens moving apparatus according to claim 10, wherein the drive signal is a differential signal.

12. The lens moving apparatus according to claim 1, wherein the first sensing coil is positioned above the coil, and the second sensing coil is positioned under the coil.

13. The lens moving apparatus according to claim 1, wherein the magnet is disposed under the first sensing coil and the second sensing coil is disposed under the lower elastic member.

14. The lens moving apparatus according to claim 1, wherein the housing comprises a seating groove, and the first sensing coil is disposed in the seating groove.

15. A camera module comprising:
   a lens;
   the lens moving apparatus according to claim 1; and
   an image sensor.

16. An optical device comprising the camera module according to claim 15.

17. The lens moving apparatus according to claim 1, wherein the one end of the first sensing coil is coupled the distal end of the portion of the first extension by a solder or a conductive adhesive and the remaining end of the first sensing coil is coupled to the distal end of the portion of the second extension by a solder or a conductive adhesive.

18. The lens moving apparatus according to claim 1, wherein the first to fourth terminals and the first and second connecting terminals are disposed at the first side portion of the base, and
   wherein a portion of each of the first to fourth terminals and the first to second connecting terminals are disposed on an outer side surface of the first side portion of the base so as to be spaced apart from each other.

19. The lens moving apparatus according to claim 1, wherein each of the third and fourth terminals comprises:
   a third portion exposed from an upper surface of the base; and a fourth portion bent from the third portion and extending toward an outer side surface of the first side portion of the base.

20. The lens moving apparatus according to claim 1, wherein a portion of each of the first and second connecting terminals is disposed on an outer side surface of the first side portion of the base.

21. The lens moving apparatus according to claim 1, wherein each of the first to fourth terminals is coupled to the base.

22. The lens moving apparatus according to claim 1, wherein each of the first to fourth terminals is inserted into the base.

* * * * *